United States Patent [19]
Atalla

[11] Patent Number: 5,960,086
[45] Date of Patent: Sep. 28, 1999

[54] UNIFIED END-TO-END SECURITY METHODS AND SYSTEMS FOR OPERATING ON INSECURE NETWORKS

[75] Inventor: Martin M. Atalla, Atherton, Calif.

[73] Assignee: Tri-Strata Security, Inc., Redwood Shores, Calif.

[21] Appl. No.: 08/552,029

[22] Filed: Nov. 2, 1995

[51] Int. Cl.[6] .................................. H04L 9/00; G09C 3/08
[52] U.S. Cl. ................................ 380/44; 380/21; 380/49; 380/50
[58] Field of Search ................................ 380/44, 21, 49, 380/50

[56] References Cited

U.S. PATENT DOCUMENTS

| | | | |
|---|---|---|---|
| 4,853,962 | 8/1989 | Brockman | 380/44 |
| 4,878,246 | 10/1989 | Pastor et al. | 380/44 |
| 5,081,677 | 1/1992 | Green et al. | 380/21 |
| 5,115,467 | 5/1992 | Esserman | 380/44 |
| 5,199,073 | 3/1993 | Scott | 380/49 |
| 5,351,293 | 9/1994 | Michener et al. | 380/21 |
| 5,602,915 | 2/1997 | Campana et al. | 380/21 |

FOREIGN PATENT DOCUMENTS

| | | | |
|---|---|---|---|
| 0 032 107 | 7/1981 | European Pat. Off. . | |
| 0 447 063 A2 | 9/1991 | European Pat. Off. | 9/8 |
| 42 43 908 | 6/1994 | Germany | 9/32 |
| 9 200 876 | 12/1993 | Netherlands | 19/7 |
| 2 223 614 | 4/1990 | United Kingdom . | |
| 95 09498 | 4/1995 | WIPO . | |

OTHER PUBLICATIONS

IEEE in Houston, Globecom '93. IEEE Global Telecommunications Theory Mini–Conference. Technical Program Conference Record (CAT. No. 93CH3250–8), Proceeding of Globecom '93. IEEE Global Telecommunications Confere, ISBN 0–7803–0917–0, 1993, New York, NY, USA, IEEE, USA, pp. 164–170 vol. 1, XP000428048 Tsubakiyama H et al: "Security for Information Data Broadcasting System with Conditional–Access Control" see p. 165, right–hand col. paragraph 1; figure 3.

Article entitled "Cryptography in Cyberspace" written by Edward J. Radlo, partner Fenwick & West, Jul. 24, 1995 contained in New Matter, vol. 20, No. 3, pp. 44–48.

*Primary Examiner*—Tod R. Swann
*Assistant Examiner*—Hrayr A. Sayadian
*Attorney, Agent, or Firm*—Skjerven, Morrill, MacPherson, Franklin & Friel LLP; Alan H. MacPherson

[57] ABSTRACT

Secure transmission of a message is achieved by using a one-time encryption key derived at the receiver and the sender from information present at both the sender and the receiver, but wherein the information from which the encryption key is derived is not transmitted between the sender and the receiver. A plurality of bytes, known as a master signature, is randomly generated and stored at the sender, wherein each byte is uniquely identified by an address. A first random subset of this plurality of bytes, called an access signature, and the addresses in the master signature of the bytes in this access signature, are stored at the receiver. To generate an encryption key, the receiver selects a second random subset of bytes, known as a session signature, from the access signature and sends the addresses in the master signature of the bytes in this session signature to the sender. The sender uses these addresses to identify the bytes in this session signature which bytes are used at both the sender and the receiver to derive the encryption key. If desired, these bytes can be used directly as the encryption key but preferably, these bytes are passed through a session signature-to-session key converter using an irreversible algorithm to generate a one-time encryption key to be used to encrypt the message to be sent between the sender and the receiver. The master signature can be also derived from the digitized video image of the user, which allows a card containing the master signature to be used as described above but also with a video monitor to visually identify the user.

70 Claims, 22 Drawing Sheets

THE SYMMETRIC MODE: MASTER SIGNATURES PROVIDED TO A AND B AND ACCESS SIGNATURES EXCHANGED BETWEEN A AND B

USER TO COMMUNICATE SECURELY WITH A
NETWORK SERVICE COMPUTER ON AN
INSECURE NETWORK

THE TRI-SIGNATURE ASSYMETRIC OPERATING MODE

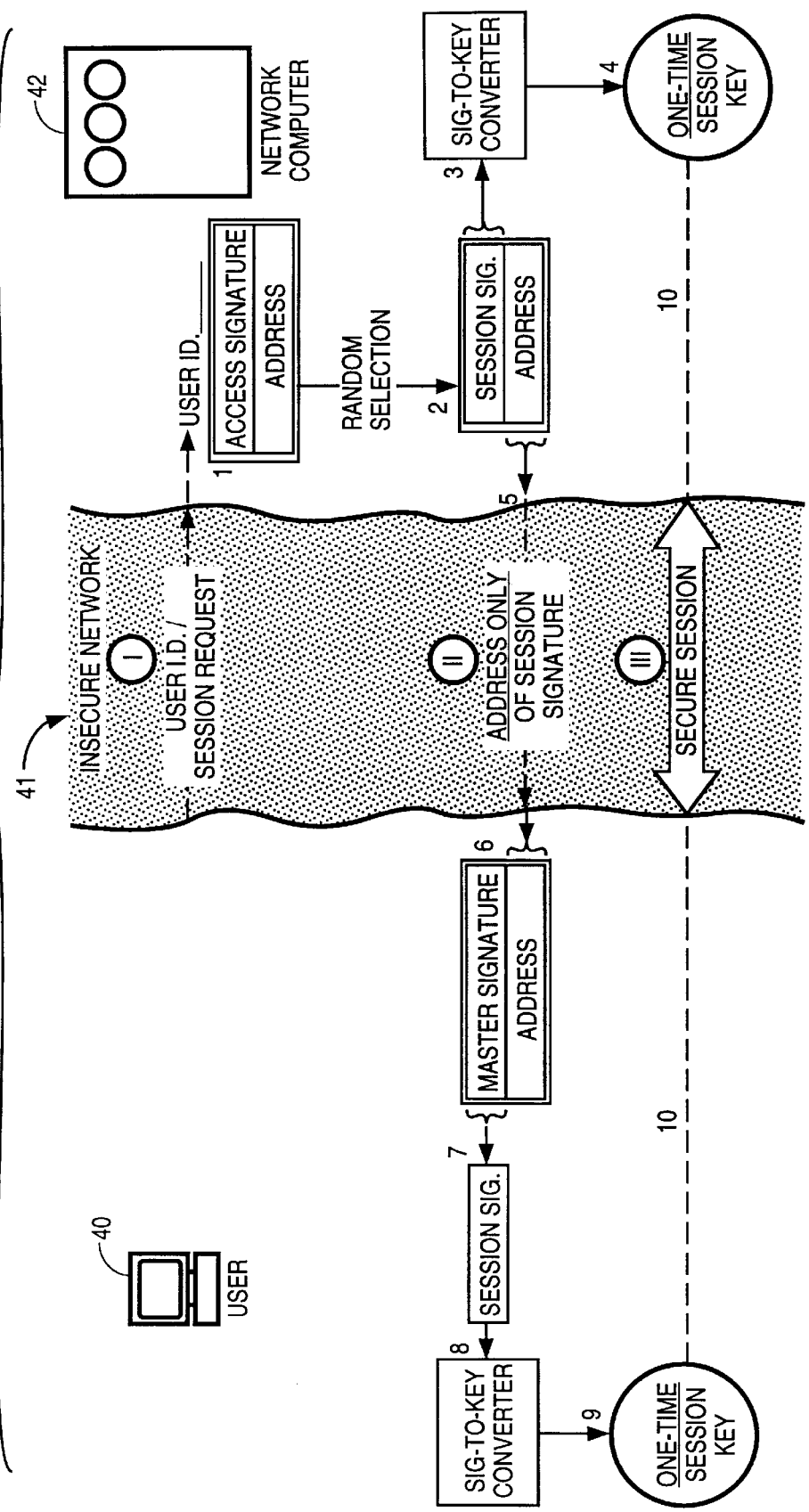

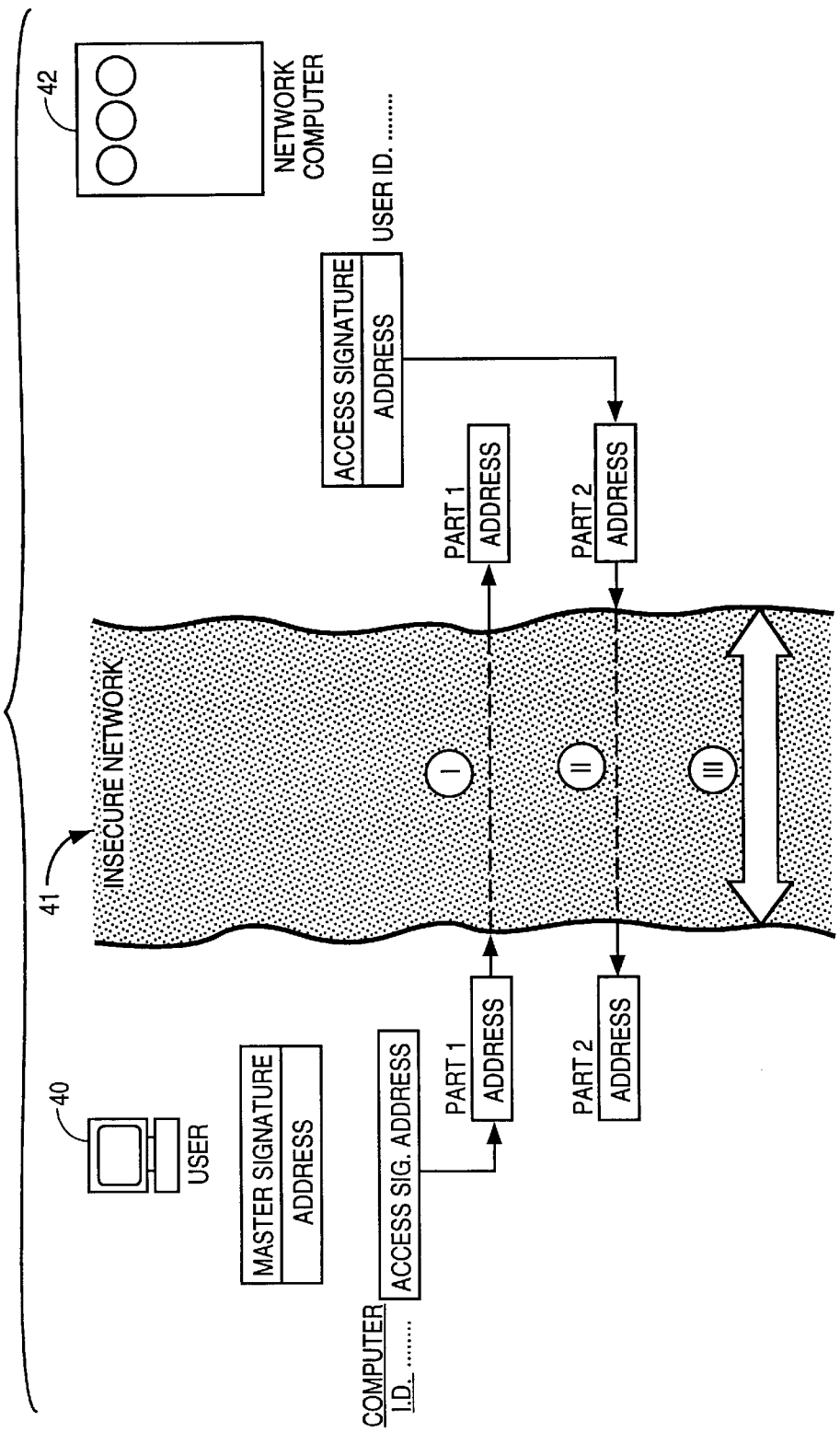

THE ASSYMETRIC MODE: ONE USER WITH ONE MASTER SIGNATURE COMMUNICATING WITH MULTIPLE COMPUTERS EACH HAVING A SEPARATE ACCESS SIGNATURE, ALL RANDOMLY SELECTED FROM THE ONE MASTER SIGNATURE OF USER.(SHOWN IS THE SPLIT-SIGNATURE SESSION INITIATION PROCEDURE)

THE SYMMETRIC MODE: MASTER SIGNATURES
PROVIDED TO A AND B AND ACCESS SIGNATURES
EXCHANGED BETWEEN A AND B

CONFIGURATION FOR SECURE COMMUNICATION
BETWEEN FOUR NETWORK COMPUTERS BASED ON
THE SYMMETRIC OPERATING MODE

SCHEMATIC OF DATA FLOW FOR THE HIGH SPEED ENCRYPTION
OF A DATA STREAM USING THE "EXCLUSIVE OR" PROCESS. HIGH
PERFORMANCE APPLICATIONS INCLUDE SECURE FILE TRANSFER
AND INTERACTIVE (REAL TIME) MULTI-MEDIA COMMUNICATIONS

PROTECTION OF SIGNATURES AT USER TERMINAL
BASED ON USER-SELECTED "PASS PHRASE"

PROTECTION OF SIGNATURES (MASTER & ACCESS) AT NETWORK COMPUTERS FOR STORAGE BASED ON COMPUTER'S "INTERNAL SECURITY SIGNATURE".

SCHEMATIC OF THE TRI-SIGNATURE "SECURITY SERVER"

THE TRI-SIGNATURE "SECURITY-SERVER" AS A FIREWALL FOR THE PROTECTION OF PRIVATE NETWORKS AGAINST RISK EXPOSURE TO THE INTERNET.

COMPARISON OF DIRECT AND HUB
CONFIGURATIONS FOR INTERCOMMUNICATIONS
BETWEEN USERS & COMPUTERS

SECURITY PROCESS FOR COMMUNICATION ON THE INTERNET BETWEEN USERS REGISTERED WITH ONE NETWORK COMPUTER HUB SHOWN IS THE HIGH-PERFORMANCE OPTION WHERE MESSAGES ARE ENCRYPTED ONLY ONCE AND DECRYPTED ONLY ONCE.

SECURING INTERNET APPLICATIONS WITH TRI-SIGNATURE SECURITY SYSTEMS

SETTING UP A SECURE TELEPHONE CALL SESSION: NOTE THAT ONCE SENDER AND RECEIVER ARE SECURITY SYNCHRONIZED, THE SECURE SESSION IS END-TO-END AND SIMPLY PASSES THROUGH THE CENTRAL OFFICE.

USER SECURITY REGISTRATION SYSTEM
ONE PROCESS: PLACES USER SECURITY
DATA IN COMPUTER FILE AND ISSUES USER
MEMORY CARD READY FOR USE

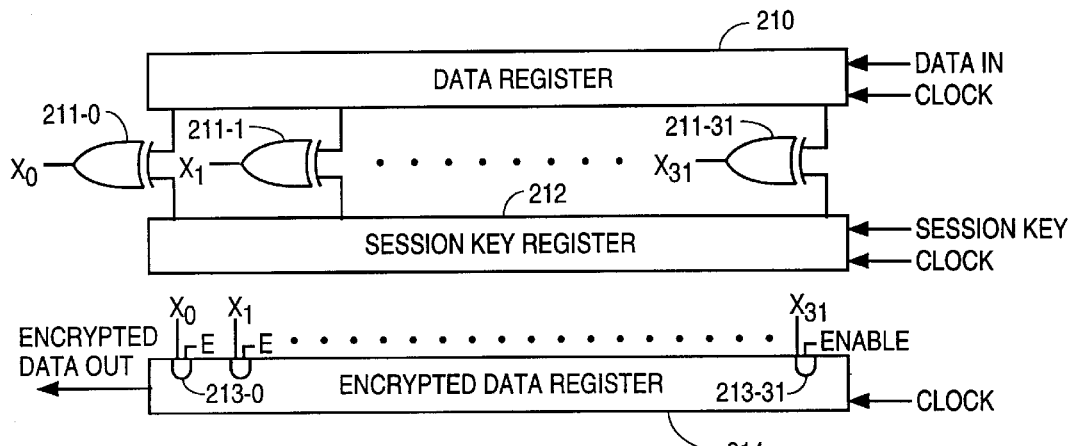
FIG. 21
FIG. 22
```
11100101110 .... 01101    DATA
01011011100 .... 10110    SESSION KEY
10111110010 .... 11011    ENCRYPTED DATA
11100101110 .... 01101    DECRYPTED DATA
```
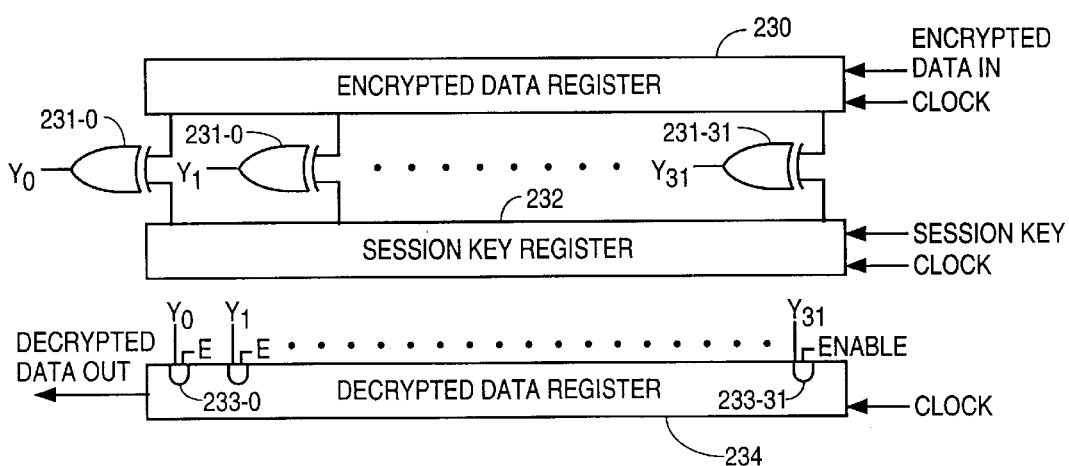
FIG. 23

UNIFIED END-TO-END SECURITY METHODS AND SYSTEMS FOR OPERATING ON INSECURE NETWORKS

FIELD OF THE INVENTION

This invention relates to secure communications and in particular to systems and methods for establishing secure sessions of communication between user and network computer, between user and user and between network and network, all on an insecure network.

BACKGROUND OF THE INVENTION

Security systems for use in communicating between a user and a network computer on an insecure network are well known. Such systems are particularly useful in protecting transactions involving transfers of money or credit card numbers from unlawful interception. One of the goals of security systems is to achieve a simple, practical and easy to manage system which avoids cumbersome bureaucratic centralization. Unfortunately, the overhead created by security systems tends to be relatively large compared to the transaction. Moreover, regardless of the configuration of a network, a security system should be seamless; that is, the system should be of general applicability within a network and between networks. The security of information being communicated over a computer network is required also to provide authenticity of the identity of sender and receiver, to protect the integrity of financial transactions and to protect critical information such as credit card information from possible illegal acquisition and use. The use of a credit card on the Internet, for example, would be inherently dangerous if hackers could easily intercept the credit card number and then use this number without the permission of the owner. Consequently, people transmitting sensitive information on computer networks use encryption and decryption techniques to hide important data.

In the simplest form of a prior art security system, a clear text message is encrypted and transmitted. At the receiving end, the encrypted message is then decrypted to obtain the clear message. In order for the receiver to decrypt the message, the receiver must know the encryption technique used to encrypt the message. This involves knowing how the message was encrypted and the key used for encryption.

The industry has developed a data encryption standard known as "DES". The DES method is in the public domain but the KEY used by a sender for encryption must be a secret that is securely conveyed only to the party receiving the message in order to allow that party to decrypt the message.

One problem in prior art security systems based on DES is how to transmit and synchronize the encryption key. The encryption key must also be handled in a secure manner. When the problem is to communicate among hundreds or thousands of people, the management of keys and their security can become difficult and frequently not practical. Key management involves the selection, distribution and maintenance of the encryption keys and their security.

Encryption algorithms vary from weak to strong. If the encryption algorithm is weak, then a third party who knows the output and the input to the system may be able to determine the key by inspection. For more robust algorithms, an exhaustive trial and error approach involving a large computer or a number of computers is a general approach to determine a key. With the DES system, 64 bits including 8 check digits are used in the key so there are $2^{56}$ possible combinations of bits to yield an encryption key. To increase the number of possible combinations, the DES system is increasing the length of the key to 128 bits to create $2^{112}$ possible combinations. In the DES system, the DES key will both encrypt and decrypt the message.

With such long keys, trial and error attacks do not represent a threat. However, there is another less sophisticated, but serious, threat. This is the risk of discovery of keys by accidental or other means, particularly for static keys or for infrequently changed keys. So, regardless of algorithm strength or key length, the "key lifetime" becomes an important factor; the shorter the lifetime, the higher the security. A static key represents the highest risk case. A security system, therefore, must be a dynamic, key changing system. The key management problems attendant with frequent key changes are difficult. However, they must be addressed and resolved on a system-wide basis.

One security system for key management is the public key system ("PKS"). The public key system is able to send a key in a secure way. Only the intended receiver can decode the received encrypted key. Each participant is issued a key called the private key. Only the issuer and the participant know the private key which is very long, maybe 200 bytes. For every private key there is a corresponding public key which is published in a public book with the I.D. of the participant. If, for example, party "A" wants to establish a communication session with party "B" to be encrypted with a "session key", "A" must communicate the session key to "B" in a secure way. The public key system can do that as follows:

1. "A" encrypts the session key with party "A's" private key.

2. After encryption with the private key of party "A", party "A" re-encrypts with the public key of the receiver, party "B", obtained from the public book.

3. When party "B" receives the encrypted session key, party "B" decrypts the message twice; first with the private key of party "B", and second with party "A's" public key. The session key now is in clear text.

The public key technique is usually not used for securing communications, but is used primarily for the secure transmission of "working keys" between users. It is the working key that is used to secure the communication between the two users, using such encryption methods as DES or others.

The public key technique has a number of weaknesses. A custodian of the keys is responsible for issuing, maintaining, and changing the keys, and is responsible also for maintaining the integrity of the public key book which contains user I.D.'s and public keys. The system is only as good as the integrity and efficiency of a centralized custodian service. It can become bureaucratic, difficult to mange and control, and costly. Moreover, it addresses only the key transmission security issue. It does not address key lifetime issues or issues of security of transmitted working keys. These issues must be collectively addressed and resolved in a unified solution. Several methods have been devised for changing keys in private systems. Others were devised for key synchronization by providing users with pre-determined sequential keys or by using timing mechanisms. The management of all such systems is not practical, particularly for larger systems.

The working key, which is sent using private and -public keys, is ideally changed frequently. But the tendency is to send the working key once and then use it for a long time. This leads to the possibility of the working key being discovered by others.

SUMMARY OF THE INVENTION

In accordance with this invention, systems and methods are provided which allow the working key to be used only once and then changed in a manner which is essentially random, fast and unique to each user.

In accordance with one embodiment of the invention, a user accessing a network computer, is issued a randomly selected bit stream of a given length, typically 10,000 bytes for an individual user, and of the order of megabytes for a computer node. This bit stream, called the "master signature", is divided into bytes, and each byte is assigned a byte address. Thus, each byte can be uniquely identified by an address. When this byte is addressed, the bits associated with that byte can be read out. A portion of the master signature randomly selected, is placed at the computer to which the user wishes to transmit a secured communication. For example, this computer could be at a bank or at any other location with which the user desires to implement a transaction. This portion of the master signature is called an "access signature". This access signature retains both the bit information in the bytes selected from the master signature as well as the addresses of those bytes in the master signature. Upon receipt of a signal from a terminal that a user possessing a master signature desires to communicate securely with, for example, the bank, the bank's computer then uses the user's I.D. transmitted to the bank's computer to identify the user's access signature. The bank's computer then picks randomly a certain number of the bytes in the access signature to form what is called a "session signature". The computer at the bank identifies the addresses of each of the bytes in the session signature and then sends the addresses of these randomly picked bytes to the user's terminal. Using the transmitted addresses from the bank's computer, the user's terminal then pulls out from the master signature the bytes associated with the transmitted addresses. Thus, the same session signature is present at the user's terminal as at the bank's computer. Of importance, the particular bytes making up the session signature are never transmitted from the bank's computer to the user's terminal or vice versa. All that is transmitted to the user's terminal are the addresses of the bytes making up the session signature. Now both the user's terminal and the bank's computer have the identical session signature.

With this process, the session keys at both the user's terminal and the bank's computer have been synchronized without ever transmitting the session key over any type of network. Of importance, the session signature is never transmitted in any form, encrypted or otherwise, over any sort of network.

In one embodiment, at the same time that the computer sends the addresses of the bytes to make up the session signature to the user's terminal, the computer also sends a challenge number to this terminal. The terminal encrypts the challenge number with the session key at the terminal, and sends the encrypted challenge number back to the computer. The encrypted challenge number is received by the computer, decrypted and compared by the computer to the transmitted challenge number. If the two do not match, the transmissions between the user's terminal and the computer terminate. If the two match, then the user's terminal has the correct session signature and an encrypted authorization number is sent back to the user's terminal. As a result, an audit trail is maintained at the central computer which allows the organization possessing the central computer to keep track of all transactions.

In accordance with one embodiment of the invention, to provide an additional level of security to keep the master signature confidential, a signature protection pass phrase is employed. The pass phrase, selected by and known only to the individual, is used to derive an encryption key which is used to encrypt the signature.

In accordance with another embodiment of the invention, the master signature associated with a person is generated from a video image of that person. This embodiment provides the means for positive visual identification of users; an added feature necessary for many applications. When an individual goes to a bank, for example, that individual's digital video picture is taken and used directly to generate the master signature. This master signature may then be further protected by encryption with a key derived from the individual's pass phrase.

In another embodiment of this invention, a session signature is converted to a session key by a session-signature-to-session-key converter. This converter makes use of an irreversible transformation which basically is a one way conversion. Thus, if one knows the output signal one is still unable to find by trial and error uniquely the input signal.

In another embodiment of the invention, a split signature technique is used to identify individuals.

In another embodiment of this invention, each side has a master signature and both sides exchange access signatures. A session signature is then generated by each side and the two session signatures so generated are combined to form the session signature from which an encryption key is produced.

This invention provides a unique key which is capable of being changed before each transaction between a user and a central computer and allows great flexibility, ease and reliability of key management, and high speed performance.

This invention will be more fully understood in light of the following detailed description taken together with the following drawings.

DESCRIPTION OF THE DRAWINGS

FIG. 4A shows the sequence of steps used to generate a one-time session key for use to secure communication between a user and a network computer.

FIG. 4B shows the procedure for generating a session key using a split signature procedure.

FIG. 21 shows an encryption system using exclusive OR gates in accordance with this invention.

FIG. 22 shows an example of the encryption and decryption of a message using a session key in accordance with this invention.

FIG. 23 shows a decryption system using exclusive OR gates in accordance with this invention.

DETAILED DESCRIPTION

Figure 1:
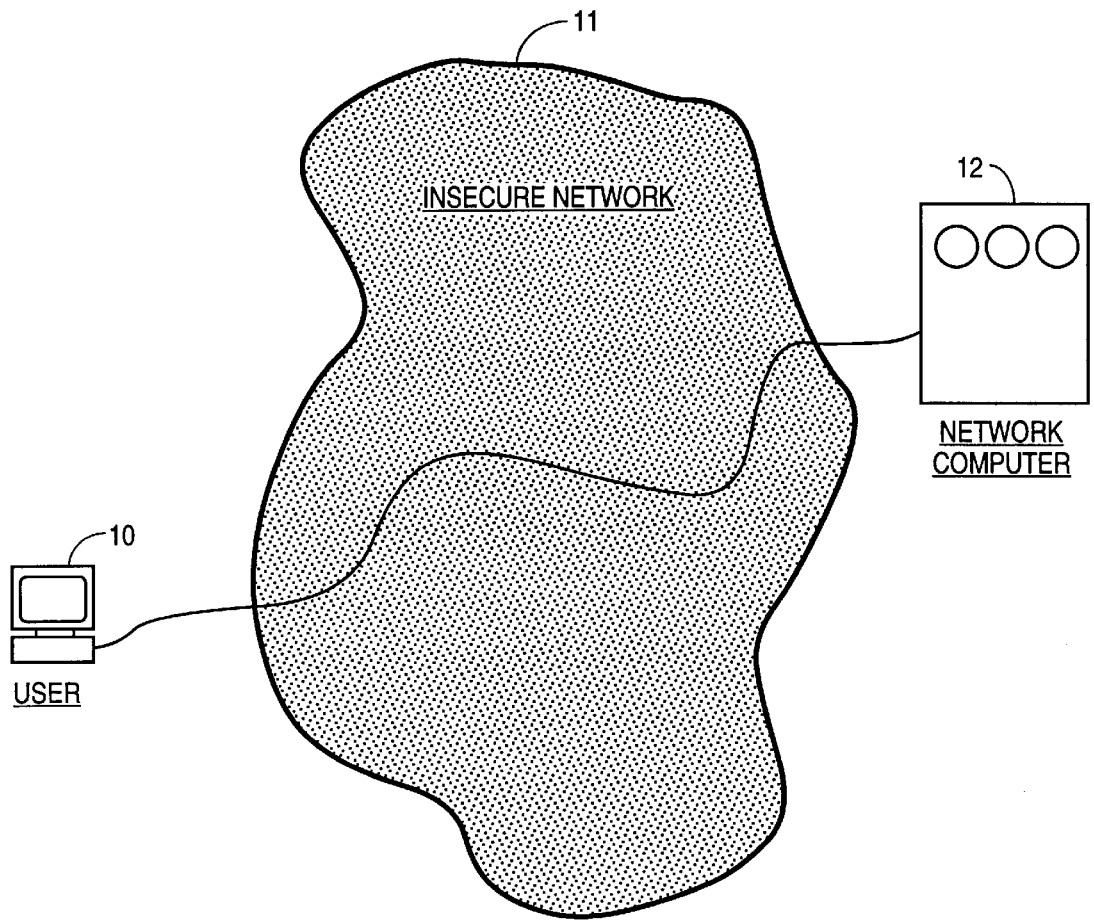
FIG. 1 shows a schematic diagram of the relationship between a user, an insecure network and a network computer.

As shown in FIG. 1, a user at a terminal 10 transmits information over a network 11 which is typically not secure. Such a network, denoted in FIG. 11 as an "insecure network", transmits the signals from the user's computer 10 to the network computer 12. Should the signal be intercepted by a third party, the third party will be able to use information contained in the signal to the third party's benefit all without the knowledge of the user. Therefore, in accordance with this invention, methods and systems are provided for encrypting the transmitted information so that a third party will not be able to intercept and illegally use the transmitted information.

Figure 2:
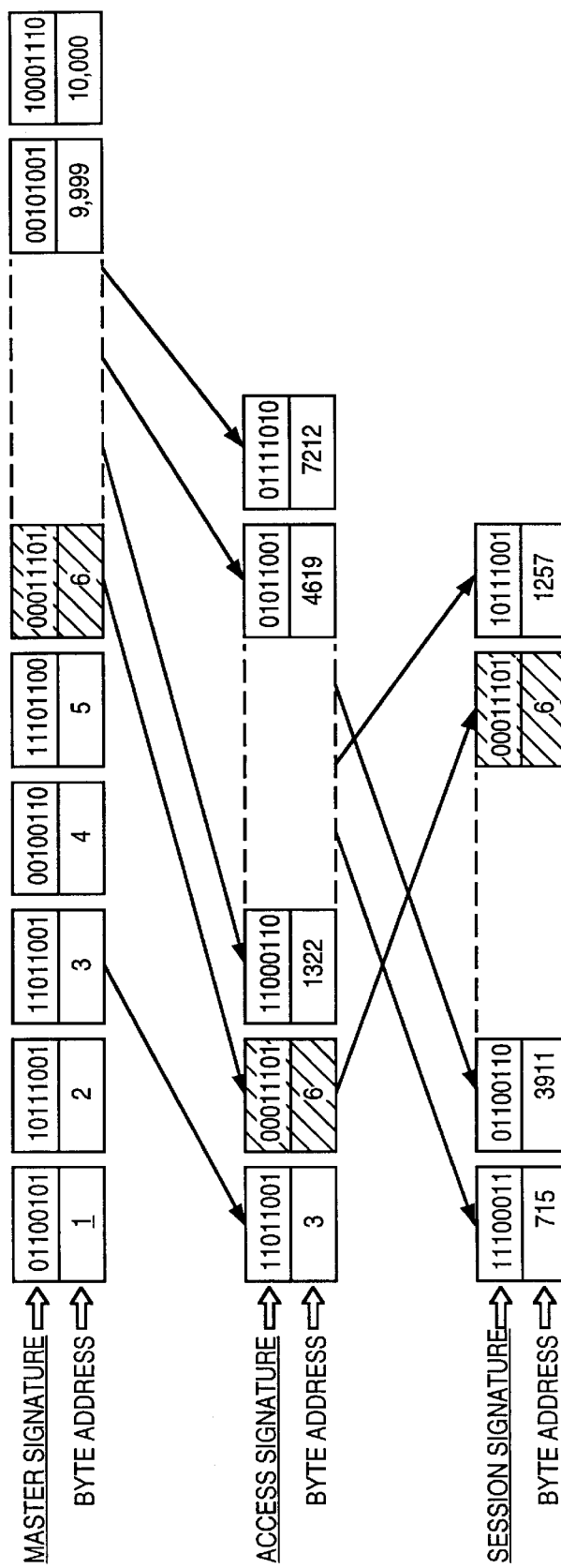
FIG. 2 shows the three signatures of the TRI-SIGNATURE hierarchy and their inter-relationships. Each signature is associated with a set of byte addresses: A master signature has a plurality of bytes together with the address associated with each byte; an access signature, which is a random subset of bytes from the master signature, also with the address associated with each byte; and a session signature, which is a random subset of bytes from the access signature, also with the address associated with each byte.

FIG. 2 illustrates the digital tri-signature security hierarchy in accordance with this invention. As shown in FIG. 2, a master signature is made up of a plurality (shown in FIG. 2 as 10,000 but capable of being any other suitable number) of bytes of information. Associated with each byte is a byte address. The plurality of bytes of information is denoted the "master signature." The master signature can be generated in a number of different ways such as by a random number generator. In one embodiment where the physical identification of the user in person is important, the master signature is generated from a user's digitized video image. This video image can be a front facial view of the user which will then allow a third party to identify the user from the master signature or it can be a side facial view of the user or some other unique view associated with the user. As a variation on this embodiment, a number of sequential frames of the user (such as 15 or 20 consecutive frames which show movement of the user) can be used and the master signature can be derived from one or more of these frames.

An access signature is then generated randomly by a computer from the master signature. The access signature is thus a subset of the bytes in the master signature and the bytes in the access signature retain the same byte addresses which they have in the master signature. As shown in FIG. 2, the access signature includes bytes 3, 6, 1322, 4619 and 7212 together with a number of other intermediate bytes not shown but represented by dashed lines. The access signature may be changed periodically or as frequently as desired.

A session signature, as shown in FIG. 2, is yet another subset of bytes and their respective addresses in the master signature selected randomly by the computer from the access signature. The session signature is depicted in FIG. 2 as bytes with addresses 715, 3911, other bytes represented by dashed lines, byte 6 and byte 1257. The bytes selected from the access signature to form the session signature have been shuffled in sequence as shown in FIG. 2 such that the byte addresses in the session signature appear in a random order and not in chronological order. The session signature is a one-time signature, i.e., it changes from session to session with little probability of repeating.

The use of the master signature, the access signature and the session signature will now be described in conjunction with a number of implementations of this invention. However, it is important to note that the basic formulation of this invention uses a tri-signature security hierarchy. The master signature, which is either randomly generated or obtained from a digitized video image of the user, typically consists of a large number of bytes (such as 10,000, for example) and is unique for each individual user. The master signature is retained by the user typically on a memory chip card, a diskette or other storage means. The user, however, may also retain the master signature in other ways such as on a computer disk. Each data byte in the master signature is assigned a sequential number. This number is called the byte address. The byte address is used for locating and identifying the associated byte.

The access signature is a random subset of the master signature and typically will have from 100 to 200 bytes. The access signature is assigned to and placed at a network computer to which the user wants access. More than one access signature may be randomly selected from one master signature of a user to allow access to other network computers each having a unique access signature associated with a given user. Each data byte in an access signature retains (and is identifiable by) its original address within the master signature.

The session signature is a random subset of the access signature and typically contains 8, 16, or 32 bytes although any other number of bytes can also be used if desired. This session signature is a transient, one-time signature, randomly selected from the access signature for each transmission of information (i.e., "session") and discarded after completion of the session. The addresses in the master signature of the bytes in the session signature are randomly sequenced as shown in FIG. 2.

Figure 3:
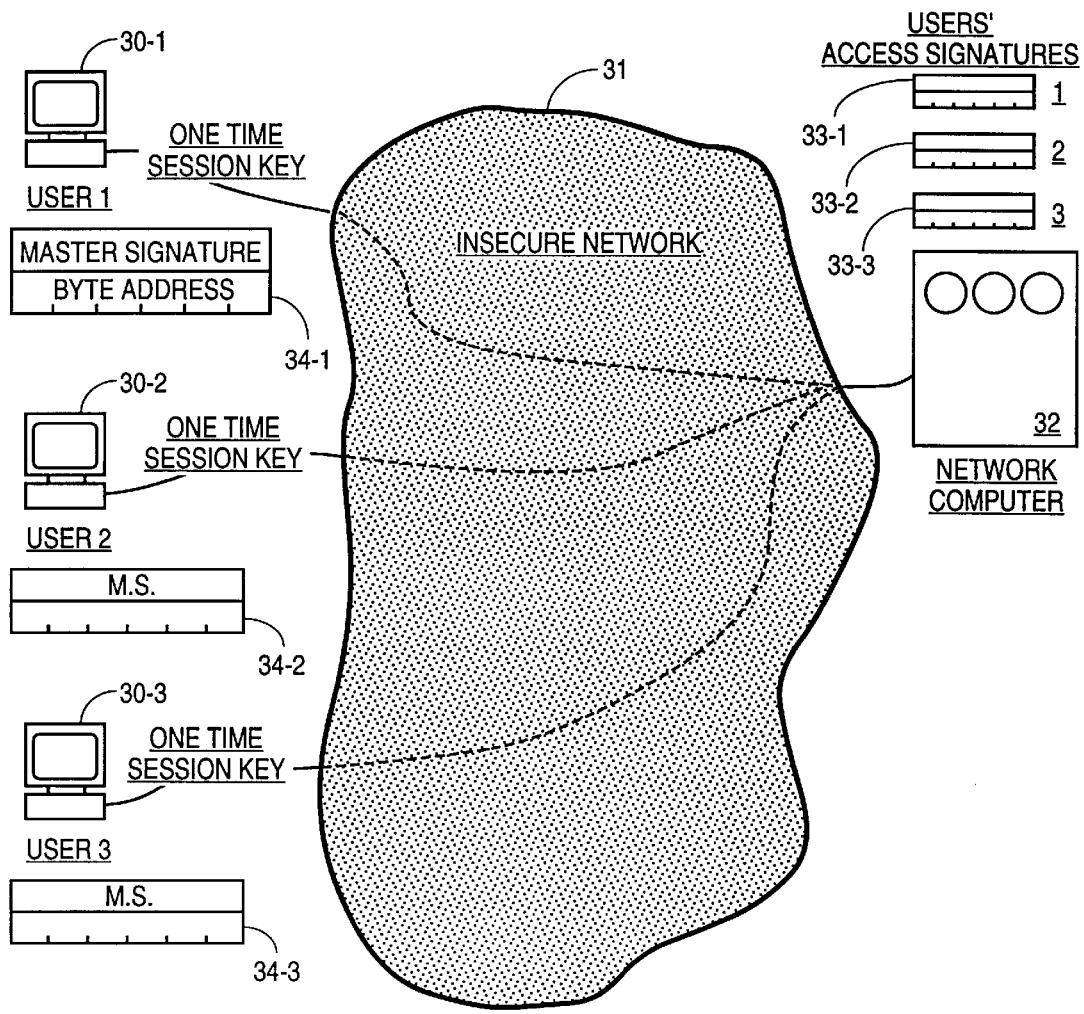
FIG. 3 shows the relationship between a plurality of users, an insecure network and a network computer possessing access signatures associated with each of the users and derived from the master signatures of the users.

FIG. 3 illustrates a system using the tri-signature security hierarchy of this invention in what is called the "asymmetric operating mode." For illustrative purposes, in FIG. 3, three separate users operating PCs, workstations, or other types of appropriate terminals 30-1, 30-2 and 30-3 are tied into a central network computer 32 through insecure network 31. Each user is provided with a master signature, the bytes in the master signature having byte addresses, as described above in conjunction with FIG. 2. The network computer 32 has in storage the access signatures of users 33-1, 33-2, 33-3. Each access signature has been randomly generated as described above from the corresponding user's master signature. Each user thus has one master signature, while the network computer 32 has one access signature from each user. During the initiation of the system, the access signatures for users 30-1, 30-2 and 30-3 are all placed on the network computer 32 along with unique identification numbers for the corresponding users. This mode of operation is called the "asymmetric mode" because only one side of a communicating pair has a master signature while the other side of the communicating pair has only the corresponding access signature. Thus, for example, user 1 using computer 30-1 has the master signature 34-1 while the network computer 32 contains user 1's access signature 33-1 derived from user 1's master signature 34-1.

The method by which a secure transmission (called a "secure session") is initiated will now be described in conjunction with FIG. 4A. To establish a secure session between a user on terminal 40 and network computer 42 over insecure network 41, the user transmits from the user terminal 40 to the network computer 42 a session request signal. This session request signal has information such as a user I.D. identifying the user as well as a signal requesting a session (i.e., permission to transmit information in a secure format to the network computer 42). In one method in accordance with this invention, the following steps then occur.

1. Network computer 42 upon receiving the user I.D. in the session request uses the user ID to identify a pre-stored access signature in the memory of network computer 42. Associated with each byte of information in the user's access signature is a byte address.

2. Computer 42 randomly selects a session signature (typically 8, 16 or 32 bytes but capable of being any other appropriate number of bytes) from the user's access signature at the computer memory. This session signature includes corresponding byte addresses for each byte in the session signature. In one embodiment, the computer will randomly rearrange the sequence of bytes in the session signature such that the addresses of these bytes are not chronologically ordered. This re-arrangement adds an additional element of randomness to the session signature.

3. Computer 42 then transmits to the user terminal 40 over the insecure network only the addresses of the bytes in the session signature. The sequence in which the addresses are transmitted to computer 40 determines the sequence in which the selected bytes will appear in the session signature.

4. Terminal 40 then receives these addresses and uses these addresses to identify from the master signature contained within the memory of terminal 40 the particular session signature selected by network computer 42. Now both the user computer 40 and network 42 computer have the identical session signature.

5. The session signature then is processed through a signature-to-key converter at both the user's computer (sometimes called a "terminal") 40 and at the network computer 42. This converter, using an irreversible (i.e., one-way function) algorithm of any well-known type generates, from the bytes of information in the session signature, a one time "session key". This key is used to encrypt or decrypt session information communicated between user 40 and network computer 42.

Note that simultaneously with the generation of the session key at terminal 40, the same session signature-to-key conversion is implemented by network computer 42 to generate the same one-time session key. Terminal 40 is now ready to begin transmitting information to network computer 42. The two sides of the transmission, namely terminal 40 and network computer 42, have an identical session key to perform all necessary session security functions. Examples are encryption or decryption of transmitted information and message authentication. Furthermore, any encryption methods and/or algorithms may be used to secure the information. The encrypted information then can be transmitted between terminal 40 and network computer 42 and upon completion of the communication session the session key and session signature are discarded.

The session signature-to-key converter can be of any type provided that it meets two fundamental security requirements: (1) it contains a robust one-way function or irreversible algorithm (i.e., for a given output and knowledge of the algorithm, the input cannot be uniquely determined) and (2) the algorithm must be non-transposable; (i.e., F(a,b)≠F(b, a)). This process of conversion of a session signature to a session key essentially precludes the possibility of determining elements of the security signatures from any discovered session keys. In other words, the conversion of the session signature through a session signature-to-key converter to a one time session key precludes a person reversing the process from deriving, from the one time session key, the corresponding session signature. This is an important step enhancing the security of the system.

The use of an irreversible algorithm to convert information in one form to information in a second form wherein a person is unable to reverse the process and thus determine the first form of the information from the second form of information is well known. There are many one way functions and algorithms to do this. Examples of such functions or algorithms are disclosed for example in the National Bureau of Standards Publication "DES Modes of Operation" NBS FIPS Publication 81, 1980 and in the publication from the National Institute of Standards and Technology entitled "Secure Hash Standard" NIST FIPS Publication 180, 1993. In addition there are available well known digital processing techniques that are applicable to produce such an irreversible transformation such as the use of feedback shift registers.

FIG. 4B illustrates another application of the asymmetric mode of operation of this invention which includes a split signature procedure. As shown in FIG. 4B, user station 40 (which can be a PC, a POS terminal, or any other type of terminal) again has a master signature uniquely associated with the user together with a unique address for each byte in the master signature. Network computer 42 again has an access signature derived from user 40's master signature with the same unique address associated with each byte in the access signature as associated with that byte in the master signature. The operation of the system shown in FIG. 4B to establish a secure session is identical to the operation in FIG. 4A except that the user terminal 40 must retain, in addition to the user's master signature, the addresses of the access signature residing at network computer 42. Each side, now, is made equally responsible for generating one of two separate parts of the session signature: each side transmits to the other the addresses only of the part of the session signature that it has generated. Upon completion of this transmission from each side to the other, each side has the addresses of the full session signature. Now each side can derive the corresponding full session signature. The procedure to generate the session key from the session signature and to secure information transmitted from user 40 to network computer 42 is the same as in conjunction with FIG. 4A.

Figure 5:
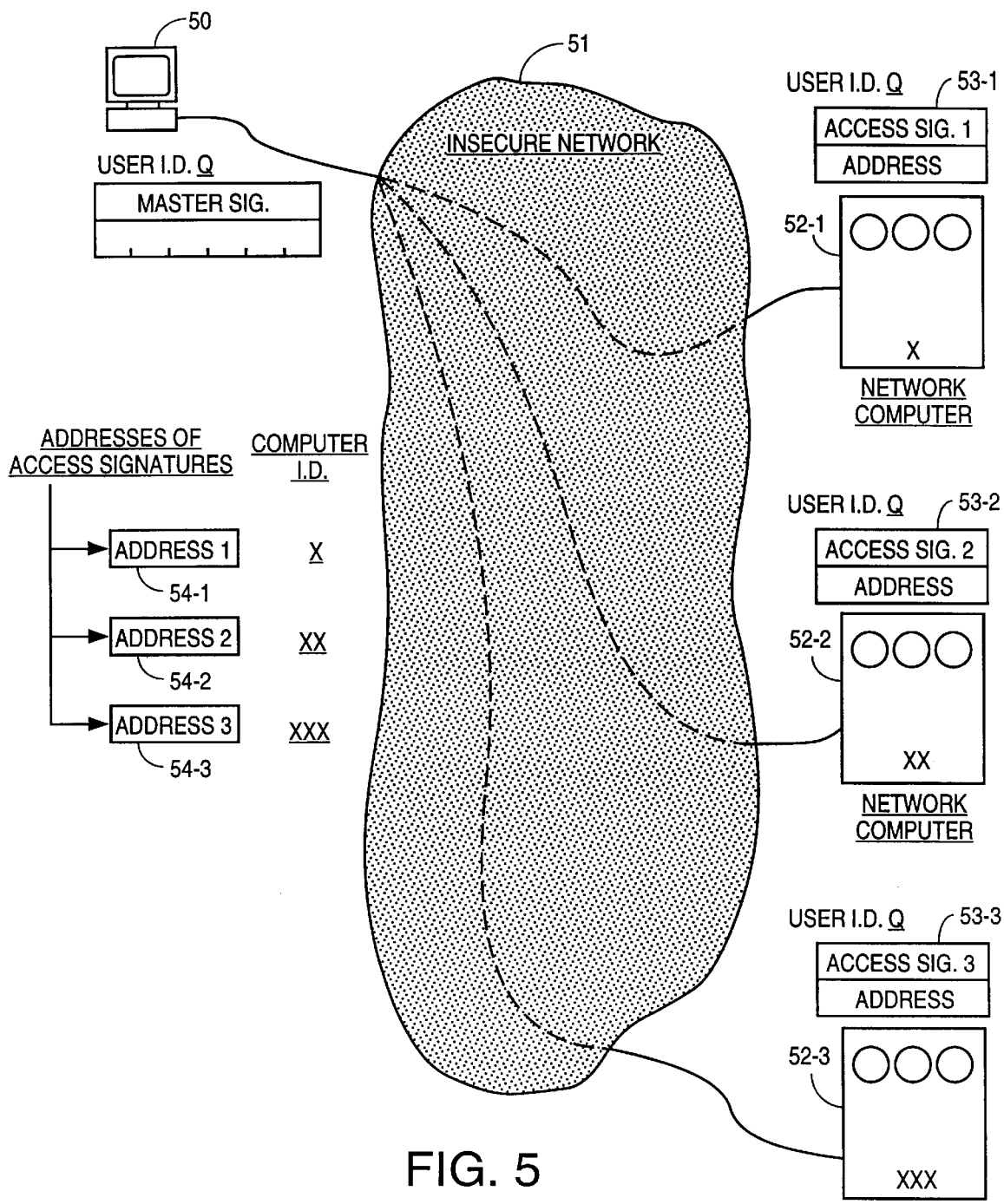
FIG. 5 shows the relationship between a user, an insecure network and multiple network computers, each network computer having a separate access signature for communicating with the user, all access signatures being selected randomly from the same master signature of the user.

FIG. 5 illustrates the operation of this invention in the asymmetric mode wherein one user with one master signature is able to communicate with multiple computers each having a separate access signature all randomly selected from the one master signature of the user. As shown in FIG. 5, the user at terminal 50 has an I.D. as well as a master signature. The master signature again is as described above in conjunction with FIG. 2 and each byte of information in the master signature has a unique address identifying that byte. To transmit information over insecure network 51, that information must be encrypted. For this purpose, each of network computers 52-1, 52-2 and 52-3 has a unique access signature 53-1, 53-2 and 53-3, respectively, each uniquely derived from the master signature associated with the user (terminal 50). Each access signature is a subset of bytes randomly selected from the master signature of user 50. Because the user has the addresses associated with the access signatures used by each of computers 52-1, 52-2 and 52-3, split signature operation of the asymmetric mode as described above in conjunction with FIG. 4B can be implemented easily in the system shown in FIG. 5. The system shown in FIG. 5 is also capable of operating as discussed above in conjunction with FIG. 4A.

Figure 6:
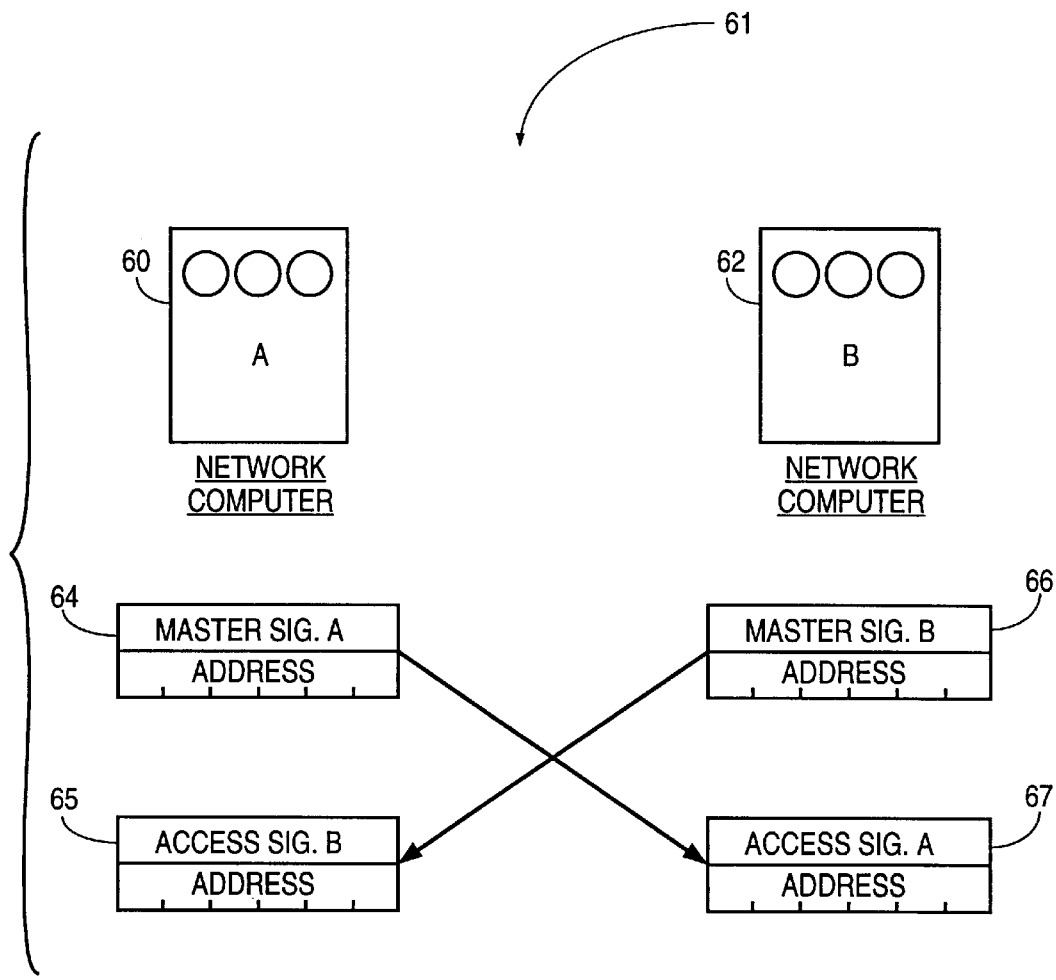
FIG. 6 shows a symmetric mode of operation where two network computers, each with an individual master signature, are able to communicate with each other using randomly selected access signatures.

FIG. 6 illustrates the symmetric operating mode of this invention. In FIG. 6 network computer 60 has associated with it a master signature A 64 each byte of which has a unique address. Network computer 62 also has associated with it a master signature B 66 each byte of which also has a unique address. Computer 62 has pre-installed from the master signature A 64 at network computer 60 an access signature A 67. Network computer 60 has pre-installed from master signature B 66 access signature B 65. Computer 60 and computer 62, each using the access signature of the other computer, generate two independent session signatures. The two signatures are combined into a final session signature. Thus, the security of the session is under the combined control of both computers, and hence, the name "symmetrical mode".

Figure 7:
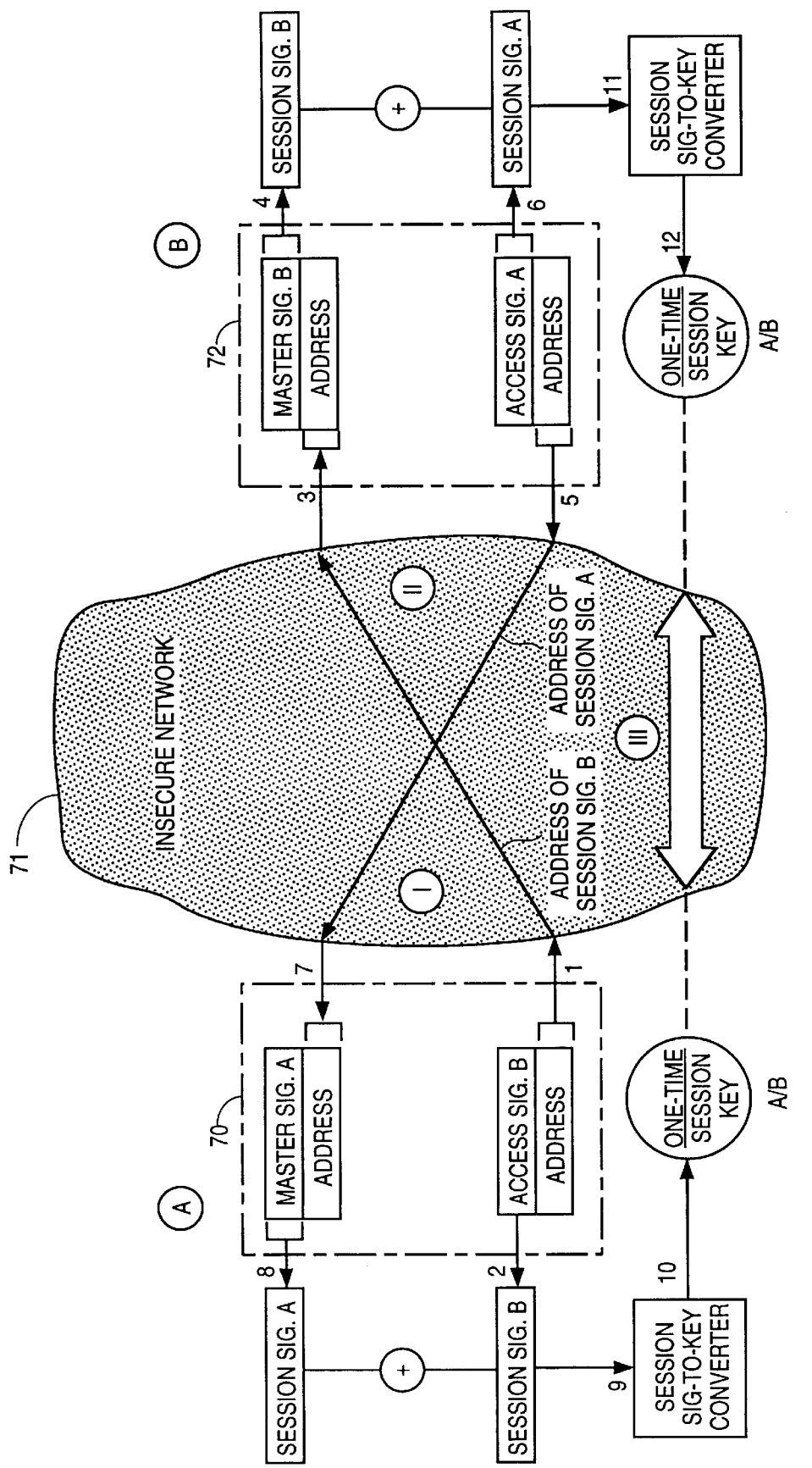
FIG. 7 shows the relationship between two network computers communicating over an insecure network using the symmetric mode of the invention where each side of a communicating pair has a master signature, and the exchange between the two, to establish a secure session, is symmetric.

FIG. 7 illustrates the symmetric mode of this invention used to establish a secure session between two network computers A and B. The communication session key A/B is derived from the combination of two independent session signatures. FIG. 7 illustrates schematically the derivation of the two session signatures in accordance with this invention. The operation of the invention as depicted in FIG. 7 is totally symmetrical. Each computer A and B generates one session signature from the access signature which each computer has in its memory from the master signature of the other computer. The session signature is retained in the generating computer and the corresponding addresses only of the bytes in the session signature are transmitted to the other computer. Thus, computer A retains the session signature A derived at computer A from the access signature B and transmits only the addresses of the bytes in the session signature B to computer B. There, computer B generates from the received address information and the master signature B the identical session signature B.

Computer B retains the session signature A derived at computer B from the access signature A and transmits only the addresses of the bytes in the session signature A to computer A. There computer A generates the identical session signature A from the master signature A using these address bytes transmitted from computer B.

At computer B, session signature B is then used with the session signature A to generate a composite session signature made up of the two session signatures B and A. The composite session signature at computer B is then converted to a session key by session signature-to-key converter 11 using an irreversible algorithm as described above.

Simultaneously, computer A generates the same composite session signature from session signature A and session signature B. This composite session signature is converted to a one time session key by session signature-to-key converter 9 using the same irreversible algorithm as used in session signature-to-key converter 11.

Thus, computers A and B now have each generated the same composite session key which will be used to transmit information securely one to the other. The one time session key stored in locations 10 and 12 associated with computers A and B is identical on the two sides. The two session signatures A and B are combined at computers A and B into one composite session signature by any one of a number of techniques but typically by concatenation.

Figure 8:
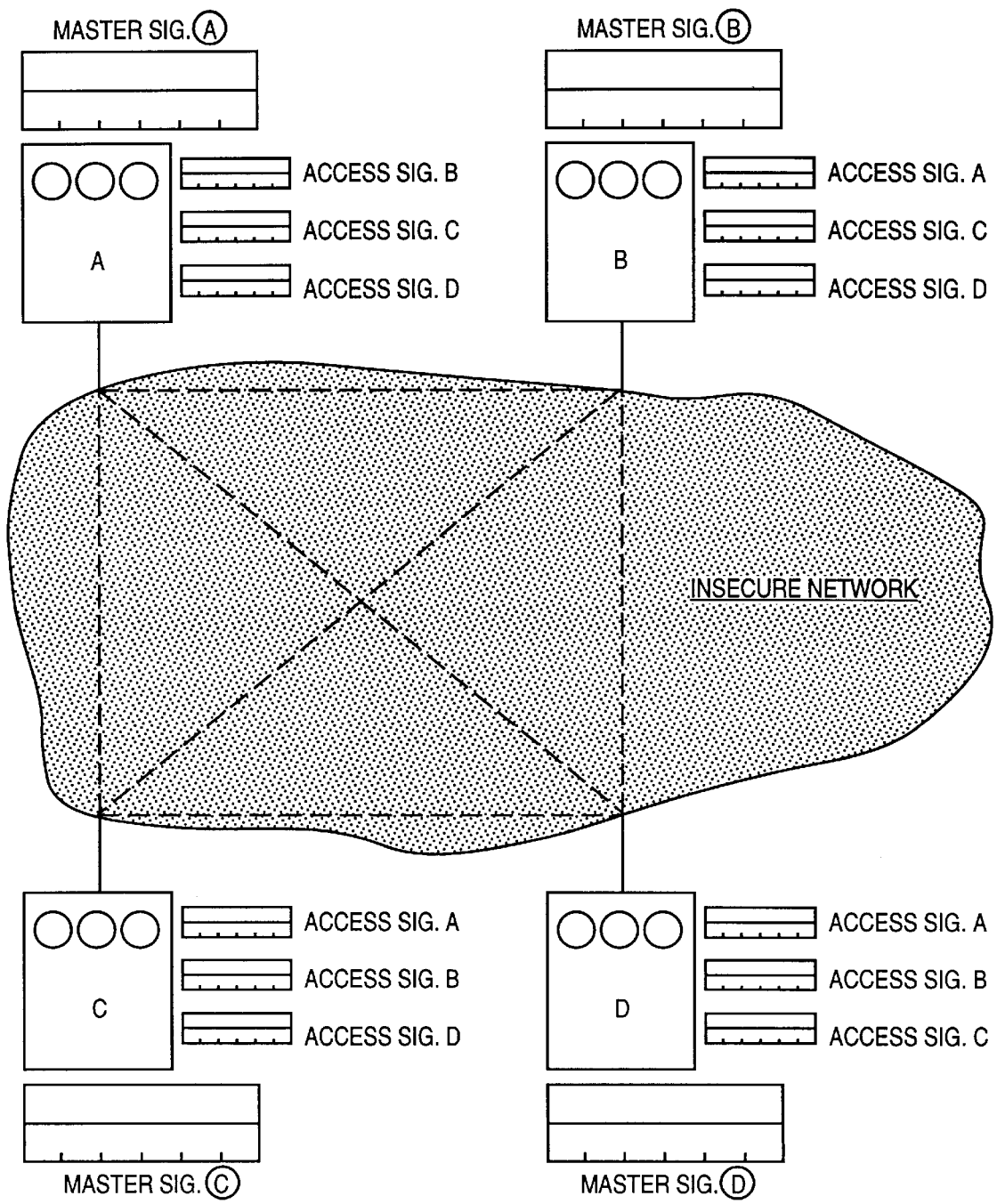
FIG. 8 shows four network computers operating in the symmetric mode using the master signatures and access signatures of this invention.

FIG. 8 illustrates a configuration associated with a number of different computers A, B, C and D based on the symmetric operating mode of this invention. Each computer A, B, C and D has associated with it a master signature A, B, C and D respectively. Each computer also stores an access signature generated from the master signature of each of the other computers in the system. Computer A thus stores access signatures B, C and D, while computer B stores access signatures A, C and D. Computer C stores access signatures A, B and D, while computer D stores access signatures A, B and C. The access signatures then are used in accordance with the procedures as described above in conjunction with FIGS. 4A, 4B, 5, or 7 to establish a secure session between any two network computers.

Figure 9:
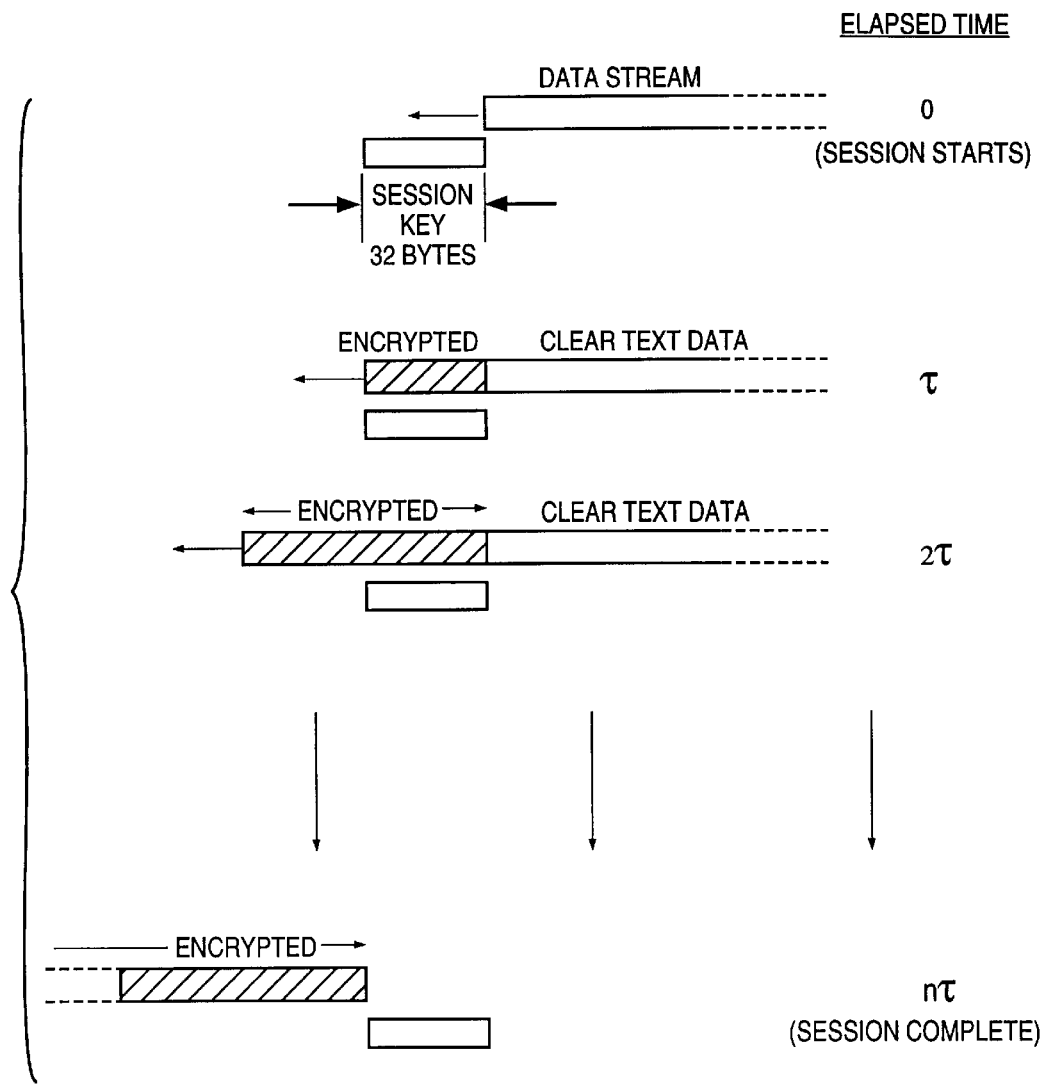
FIG. 9 shows a schematic of the data flow for the high speed encryption of a data stream using the exclusive OR structure of this invention.

FIG. 9 illustrates schematically the data flow for the high speed encryption of a data stream using an exclusive OR process in accordance with this invention. Because this invention allows a one-time encryption key to be used, a simple encoding process can be used allowing the application of the method of this invention to high speed performance systems. High performance uses include secure file transfer and interactive real time multimedia communications. As shown in FIG. 9, a data stream to be encrypted in accordance with this invention is transmitted into an encrypting structure. Such a structure is shown in more detail in FIG. 21, for example.

As shown in FIGS. 21, 22 and 23, simple exclusive OR structures can be used to both encrypt the message to be transmitted and decrypt the transmitted message. The simple exclusive OR approach provides high performance and good security capabilities for many commercial and business applications. A one time key operation permits the use of simple or even trivial encryption/decryption methods which are inherently fast and can provide high performance. These methods are obviously of little or no value for securing the usual fixed or long lifetime key systems.

FIG. 21 illustrates a simple data encryption system in accordance with this invention. Data to be encrypted is fed into data register 210. Data register 210 can be any length desired but is shown as containing 32 bits. The data is clocked in by a signal bon the clock input lead. When all 32 bits of data are read into the data register, one input lead of each of exclusive OR gates 211-0, 211-1 through 211-31 is driven by the bit in each corresponding register of data register 210. The other input lead to each of exclusive OR gates 211-0 through 211-31 is driven by the corresponding bit in the session key stored in session key register 212. Session key register 212 contains on a one-to-one basis a bit in the session key to be used to encrypt a corresponding data bit in the data register 210. Upon completion of the loading of data into data register 210, an enable signal is transmitted to the enable lead of each of the AND gates 213-i, where $0 \leq i \leq 31$. The output leads from AND gates 213-i are connected to the input leads to encrypted data register 214. The enable signal enables AND gates 213-0 through 213-31 to transmit in parallel into corresponding registers in encrypted data register 214 encrypted data bits representing the data in data register 210.

As shown in FIG. 22, a data sequence 11100101110 . . . 01101 is encrypted by a session key 01011011100 . . . 10110 to become encrypted data 10111110010 . . . 11011. This encrypted data is then transmitted to the receiver over an insecure network as described above.

At the receiver associated with the insecure network, the encrypted data is transmitted into an encrypted data register 230 (FIG. 23). Encrypted data register 230 is shown to contain 32 bits of data but can be of any appropriate length. The encrypted data in encrypted data register 230 is then transmitted to the corresponding input leads of exclusive OR gates 231-0 through 231-31. Each of these exclusive OR gates 231-0 through 231-31 has on its other input lead a corresponding bit from the session key. Upon completion of the loading of encrypted data register 230 with 32 bits of encrypted data, an enable signal is transmitted to the enable input leads of AND gates 233-0 through 233-31. The output leads from AND gates 233-1 through 233-31 are connected on a one-to-one basis to the input leads to each register in decrypted data register 234. The data on the output leads Y0, Y1 through Y31 of the exclusive OR gates 231-0 through 231-31 then is simultaneously transmitted in parallel into corresponding registers within decrypted data register 234 in response to the enable signal. Upon the loading of decrypted data register 234, the decrypted data can be serially read out of decrypted data register 234 by clocking register 234 with clock signals on the clock input lead.

FIG. 22 illustrates the decryption of the encrypted data sequence 10111110010 . . . 11011 into the decrypted data 11100101110 . . . 01101 which corresponds identically to the input data using the same session key as used to encrypt the data.

Thus, a simplified hardware system has been provided to both encrypt and decrypt the data. Because the session key stored in registers 212 and 232 is used only once and will be discarded following the completion of the session communication, the data is safely transmitted with minimal cost and minimal overhead.

One of the advantages of this invention is an extremely high speed performance. This results from:

1. A very fast (on the order of a few milliseconds) process for changing the encryption key. The encryption key is changed merely by generating new addresses of bytes in the access signature to make up a new session signature and transmitting these new addresses from the receiver to the sender so that both the receiver and the sender can simultaneously generate a new encryption key from the new session signature.

2. The use of a simple and fast process to encrypt and decrypt the information to be transmitted as part of each transaction made practical by the use of a new encryption key for each new transaction (the resulting security is quite adequate for many applications).

In contrast, the public key system described above in the prior art section of this specification requires several seconds at best to generate a new encryption key, encode that encryption key with the public and private keys and transmit the so-encoded encryption key to the receiver where the receiver must decode the received encryption key.

With a large system involving many users and a central network computer, with high transaction rates, the changing of an encryption key using the public key system will be extremely cumbersome and slow.

With a 100 Mhz processor, and using a 32 byte key, data can be encrypted or decrypted at rates approaching 1,000 MB/sec.

The invention offers a low security overhead for the high speed secure transfer of data files. This makes possible secure interactive (real time) multimedia communications.

Because the encryption and decryption utilize a simple process and occur in parallel, only a few clock cycles are required to encrypt and decrypt and the hardware cost is minimal.

While the encryption structure of FIGS. 21 and 23 show the use of 32 bit registers for the data to be encrypted and decrypted and the session key, longer registers capable of holding 32 bytes, for example, can also be used, if desired.

Figure 10:
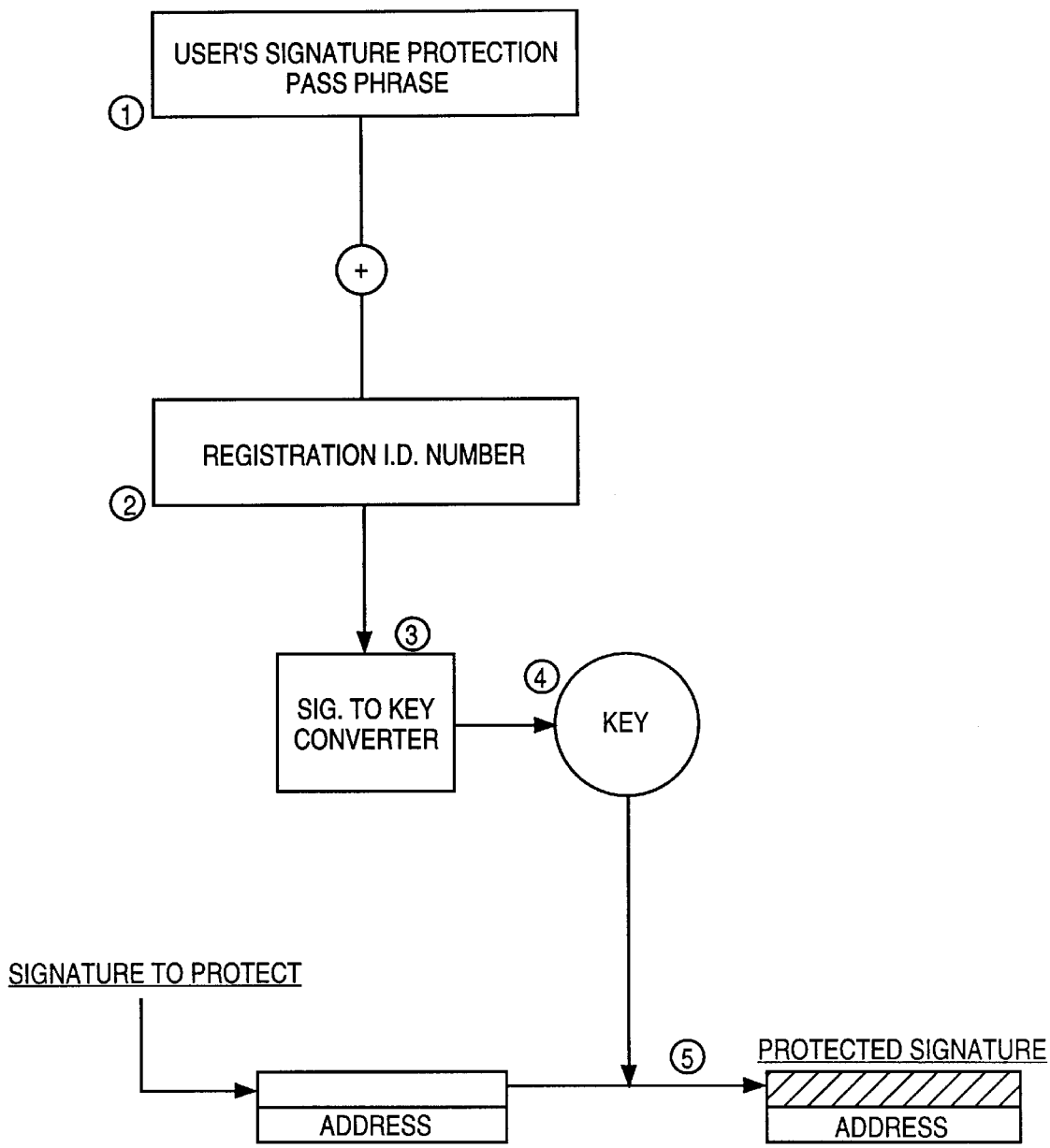
FIG. 10 shows the process for the protection of signatures at a user terminal, based on using the user's "pass phrase".

A user's master signature and other signatures held by the user must be secured against discovery by others. FIG. 10 illustrates the process for signature protection at a user's terminal in accordance with this invention wherein a personal secret "pass phrase" of a user is utilized to encrypt the signature. Thus, if an individual discovers the user's encrypted signatures and attempts to use the encrypted signatures to transmit secure information or receive confidential information relating to the user, the unauthorized user is unable to do so unless the unauthorized user has some way of determining the authorized user's pass phrase, which resides only in the authorized user's mind. As shown in FIG. 10, the user's signature protection pass phrase and the user's registration I.D. number are passed through a signature-to-key converter using an irreversible algorithm to provide a pass phrase key. The signature to protect is then encrypted using the pass phrase key to provide a protected signature. Should the unauthorized user attempt to determine the user's pass phrase by a trial and error process, the unauthorized user will have no way of knowing when in fact he or she has successfully obtained the correct pass phrase since the signature itself is random. In other words, the unauthorized user will not be able to recognize when he or she has in fact determined the correct pass phrase and the correct protected signature.

The unique user pass phrase used with this invention to protect the master and access signatures should be long and yet should be easily remembered by the user. The pass phrase can be any combination of numbers, letters and words. In accordance with this invention, the length recommended for the pass phrase is eight or more bytes.

The pass phrase is known only to the user and resides only with the user. In this invention, it is never required to be shared with any network computer. The pass phrase is strictly unique to a single user and thus is useable only at the user's terminal. The central computer has no knowledge of the pass phrase. Furthermore, the security application program provided allows the user to change the pass phrase at any time and as frequently as desired. Such changes do not involve any participation by the network computer. Since the signature data that is being protected is essentially random, an exhaustive trial and error attack applied to an encrypted signature to determine the pass phrase is not possible. This is because the result of each trial cannot be validated without involving the computer with which the user has been registered.

As a feature of this invention, the user can change the user's signature protection pass phrase at any time without involving the network computer. The user must input both old and new pass phrases to be able to update the encrypted signatures. The old pass phrase is required to decrypt the encrypted signature and the new pass phrase is used to re-encrypt the signature.

For a given set of master and access signatures, the system provides one time session encryption keys which are automatically synchronized.

The user or network computer may change the access signatures they have previously generated and distributed. This is done by generating and transmitting "an access signature change message" secured by the previous access signature. This may be done periodically or even as frequently as once after each session.

Similarly, a master signature may be changed periodically or as needed. New access signatures must then be generated from the new master signature and transmitted to their respective locations to replace previous access signatures. Here, also, a transmitted new signature may be secured by the old signature.

Figure 11:
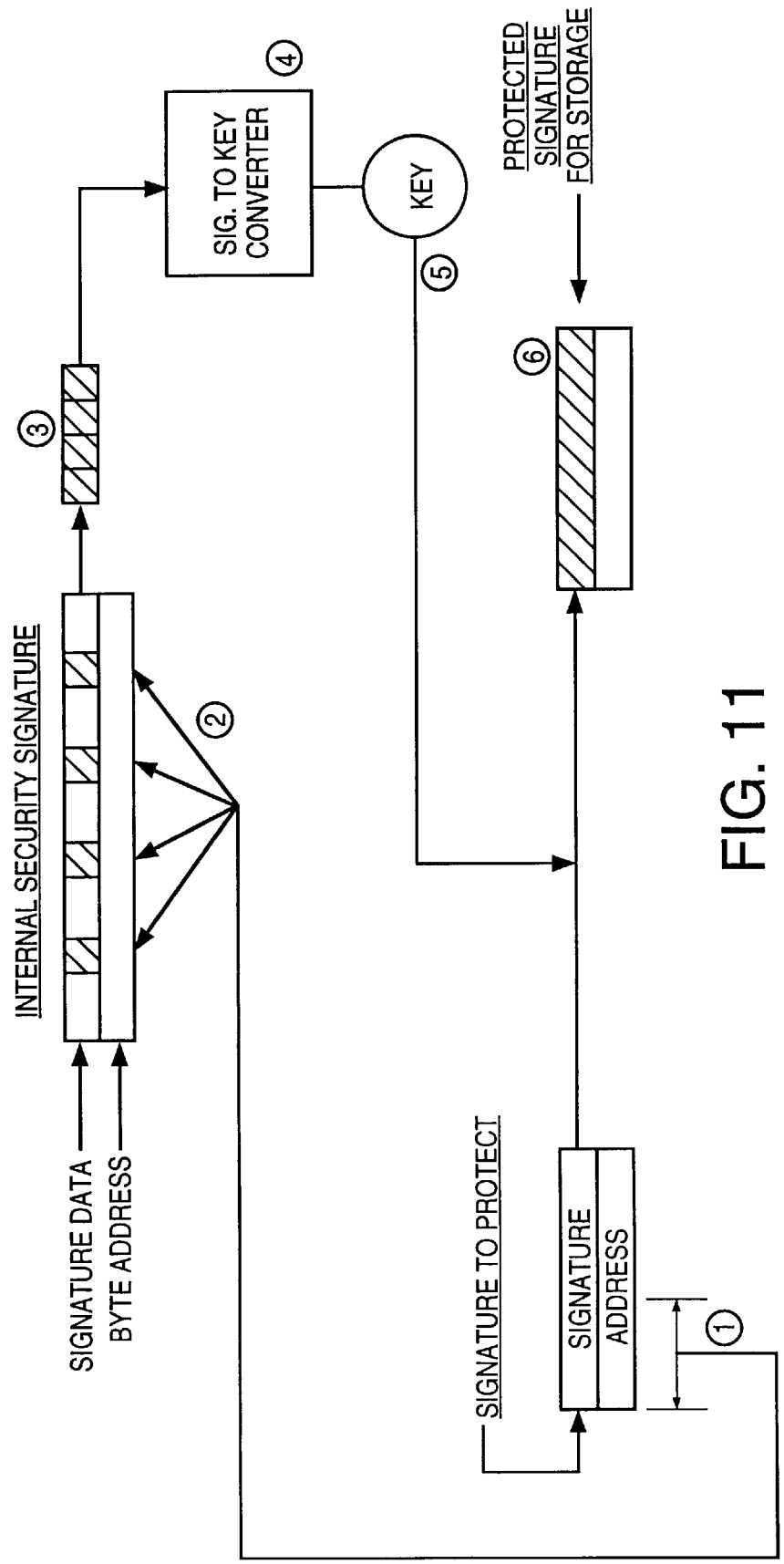
FIG. 11 shows the process for the protection of signatures stored at network computers based on a computer's internal security signature.

Similarly, the signatures held by a network computer must be protected. FIG. 11 illustrates the introduction and use of an internal security signature to encrypt and thus protect all master and access signatures stored in the computer each with a unique key. FIG. 11, an embodiment of this invention, specifically shows how one signature is encrypted for storage. To generate the encryption key, a selected number of addresses of the signature to protect are selected. The addresses selected from the signature to protect are used to generate, from the internal security signature, bytes corresponding to the selected addresses. These bytes are then read off the internal security signature and passed through a signature-to-key converter as described above to generate the encryption key. The encryption key is then used to secure the signature to protect. The encrypted signature is then stored. This encryption key is unique for the signature to protect. Using the addresses from the signature to protect reduces the amount of information that has to be stored in order to regenerate the encryption key. Of importance, the process of selecting the addresses to be used to generate the encryption key has to be known so that it can be repeated for decryption to perform security operations.

The use of an internal security signature as described in conjunction with FIG. 11 for computer file protection where each signature to protect is protected by encryption under a different key is unique in accordance with this invention. And each key is determined by the signature to be protected itself.

The security system of FIG. 11 is based on using a randomly selected internal security signature which typically is 10,000 bytes long and is used exclusively for the protection of signatures for storage. Depending on the specific application, and size of the file, the signature length can be shorter or longer. FIG. 11 above illustrates the six steps of the process. The byte addresses associated with the signature to be protected determine the specific data bytes that must be chosen from the "internal security signature" and used to obtain the encryption key.

An encrypted signature retrieved from storage can be decrypted using the reverse process.

The internal security signature must be protected. A hardware security approach is preferred to perform all security functions. The initiation of a new hardware facility follows standard procedures as follows:

1. The "internal security signature" is randomly generated internally and maintained in internal memory without possibility of extraction by an external means.

2. Multiple encryption keys are entered by multiple independent security personnel. The encryption key resulting from a combination of the multiple encryption keys is used to encrypt the internal security signature. The encrypted signature is placed in external safe storage. The security personnel keys are stored securely in separate secure storage.

3. Should the system need re-initiation, the stored data, encrypted signature and security personnel encryption keys are retrieved and used to regenerate the internal security signature.

As can be seen from the above, each session signature is a randomly selected subset of data bytes of the access signature. For an access signature of 100–300 bytes, the number of possible session signatures (8, 16, or 32 bytes or perhaps some other number of bytes) that can be selected is astronomical. The protection of all the session signatures is dependent on protecting the 100–300 bytes of the access signature. Thus, the following rule is important: Session signatures must, with few exceptions, never be used directly as encryption session keys. Rather the session signature must be converted by a signature-to-key converter to a session key. This is done by processing each session signature with other data through a robust irreversible conversion algorithm to produce the encryption session key.

There are three requirements for the conversion process:

1. The conversion process must be based on a one-way function for which there is no known explicit reverse function.

2. Exhaustive trial and error attack for a given output must result in a large number of possible inputs from which the real session signature input cannot be identified.

3. The one-way function utilized must also be non-transposable, i.e., $F(a,b) \neq F(b,a)$.

Any encryption method is directly usable in accordance with this invention. The tri-signature hierarchical system of this invention performs the following security functions:

1. Generates a one time session key;
2. Provides automatic key synchronization between communicating points; and
3. Provides any key length desired.

All security operations can be performed such as, (a) encryption, total or partial, (b) decryption, (c) message authentication, (d) hashing, (e) user and sender identity authentication and (f) combinations of the above.

The tri-signature hierarchial security system of this invention has high performance capabilities. The basic feature is one key per session or one time key operation. A key once used probably will never be used again. The discovery, by whatever means, of one or several session keys cannot compromise the security of subsequent sessions. This is to be contrasted with systems with essentially fixed keys or long lifetime keys. One is able, therefore, to use simple, high speed encryption methods, e.g., exclusive OR, and achieve high overall system performance.

The security system of this invention can be used in a security server/relay hub system and can be used in conjunction with a network such as the Internet or other insecure networks. The system of this invention can also be used with telephone networks to secure the transmission of digital voice signals, data or multi-media information. The security system of this invention can be used in a number of different applications ranging from point of sale terminals and systems, payment systems, and business, state and federal secure computer networks.

Figure 12:
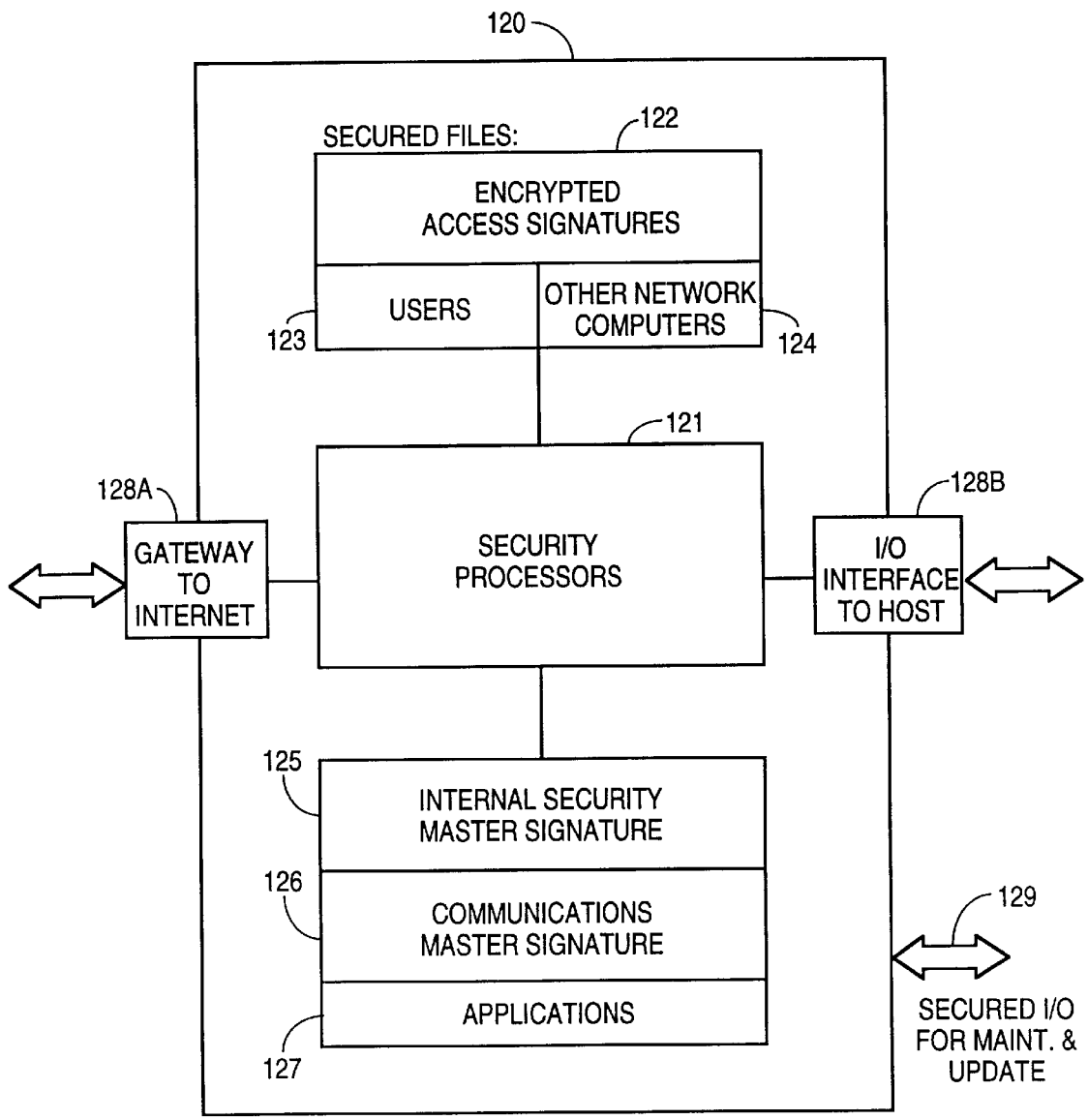
FIG. 12 shows a schematic block diagram of the self-contained, physically secure tri-signature security server for use at a network computer as per this invention.

FIG. 12 illustrates a physically secured self-contained security processor 120 for use with this invention at network computers or network service hubs. The security processor is encased in a physically protective box 120 which is essentially tamper proof. Enclosed within box 120 are all the security data files for users and other network computers as well as internal security data, security applications programs and all other information and/or programs required to implement the system in accordance with this invention. Secured within the security processor 120 are the secured files representing the encrypted access signatures 122 of users 123 and of other network computers 124. In addition, stored within security processor 120 are the internal master signature 125, the communications master signature 126 for secure communications with other network computers and applications 127 required to perform the various security functions of this invention. Access to and from security processor 120 is provided through a gateway to such networks as the Internet 128A and through the I/O interface to the host computer 128B. In addition, a secured I/O 129 for maintenance and updating the information in the security processor 120 is also provided. Thus, security processor 120 (also called a "security server") includes all the information necessary to implement all security processes of this invention.

Figure 13:
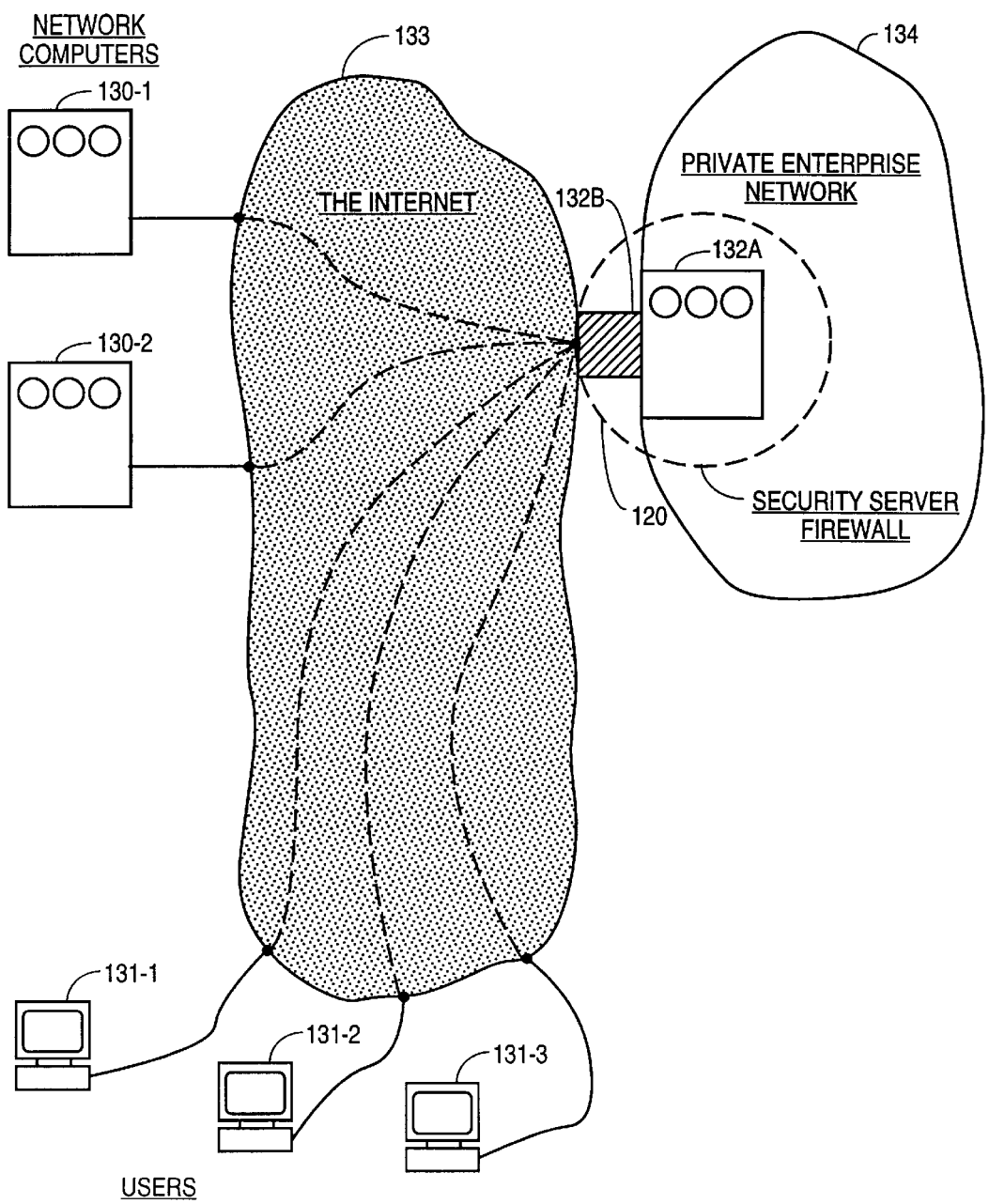
FIG. 13 shows the tri-signature security server as a "firewall" for the protection of private networks against risks due to exposure to the Internet.

FIG. 13 illustrates the use of the tri-signature security server shown in FIG. 12 as a firewall for the protection of a private enterprise network 134 against the security risk inherent to the Internet 133. Users 131-1, 131-2 and 131-3 communicate through a security server firewall 120 of the type shown in FIG. 12 to various computers and users connected to the private enterprise network 134. In addition, network computers 130-1 and 130-2 also are able to communicate through the firewall 120 with users of the private enterprise network 134. These communications are across the Internet 133 which is inherently insecure. Accordingly, the encrypting and decrypting methods described above and below in this specification will be used to secure the information being transmitted through the Internet to prevent unlawful access to and use of this information. The security server firewall assists in this encrypting operation by providing a session signature to each of the users 131-1, 131-2 and 131-3 and to each of the network computers 130-1 and 130-2 in accordance with either the asymmetric or the symmetric mode of operation described herein. In fact, any of the modes of operation described in this specification can be used with the security server 120 at the firewall.

Of interest, the systems and methods of this invention can also be used to secure communications within the private enterprise network 134.

Figure 14:
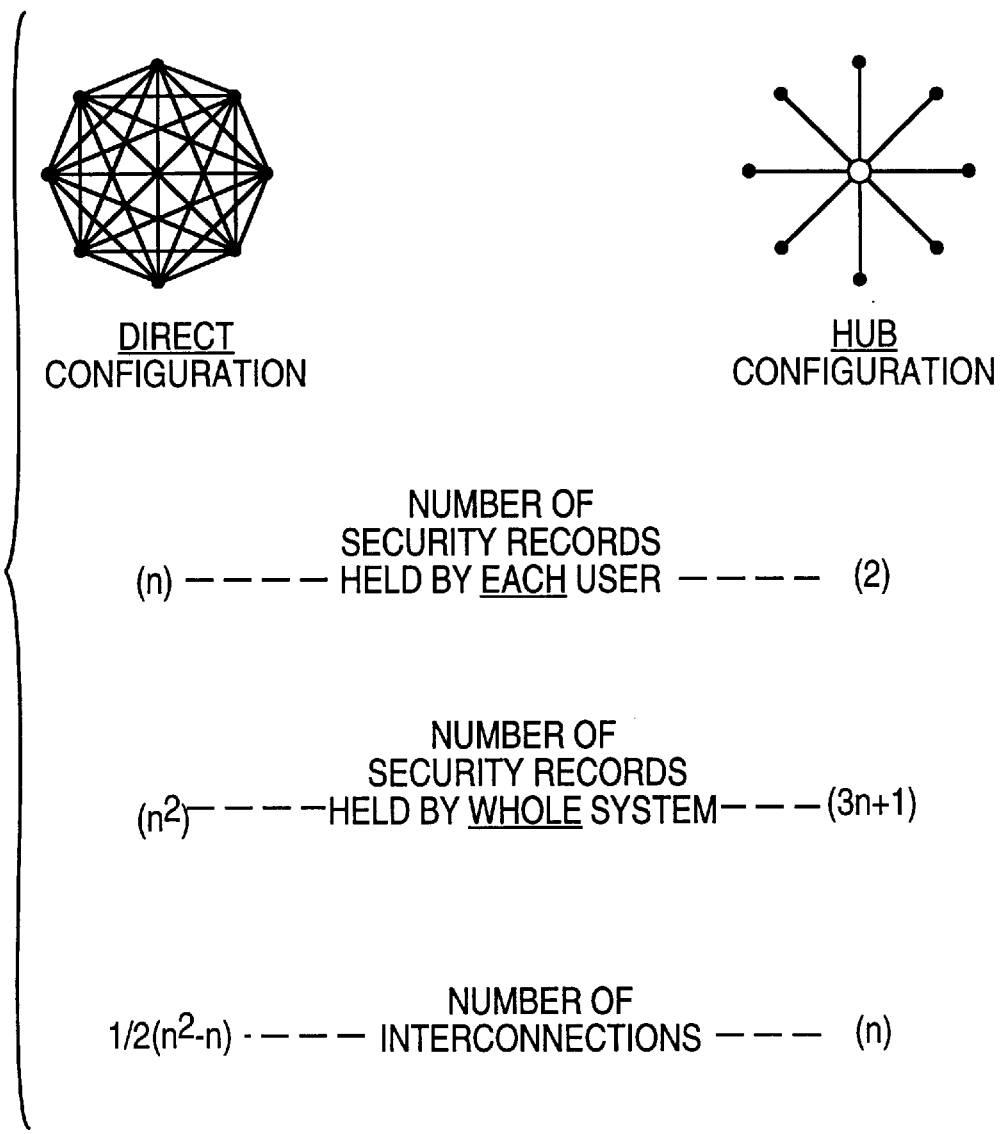
FIG. 14 compares the direct and hub configurations for intercommunications between users and computers.

FIG. 14 compares a direct communication configuration with a hub configuration. From FIG. 14 the superiority of the hub system over the direct configuration system as the number of interconnecting users becomes larger is clear. For small groups of users, of the order of tens, the direct configuration can be effective, practical, and reasonably manageable. In the direct configuration, each individual user must participate in the exchange of security data with every other member of the group and is responsible for maintaining and updating all of this security data. For larger systems, however, security control problems become unwieldy and difficult to manage. For such larger systems, the HUB configuration is the only practical alternative. Here each user participates in the exchange of security data only with the security HUB. Thus, session key management becomes simpler than with the direct configuration. As shown in FIG. 14, the number of security records held by each user in the asymmetric mode of operation is linearly proportional to the number of users in the direct configuration but is limited to two in the HUB configuration. The number of security records held by the whole system for the symmetrical mode of implementation of this invention in the direct configuration is $n^2$, where n is the number of users, while the number of security records held by the whole system for the symmetrical mode of operation in the HUB configuration is $3n+1$.

The number of interconnections in the direct configuration is given by $\frac{1}{2}(n^2-n)$ where n is the number of users, whereas the number of interconnections in the HUB configuration is just n. Thus, as the number of users goes up, the number of interconnections in the direct configuration goes up proportional to $n^2$ whereas in the HUB configuration the number of interconnections is equal to the number of users n.

Figure 15:
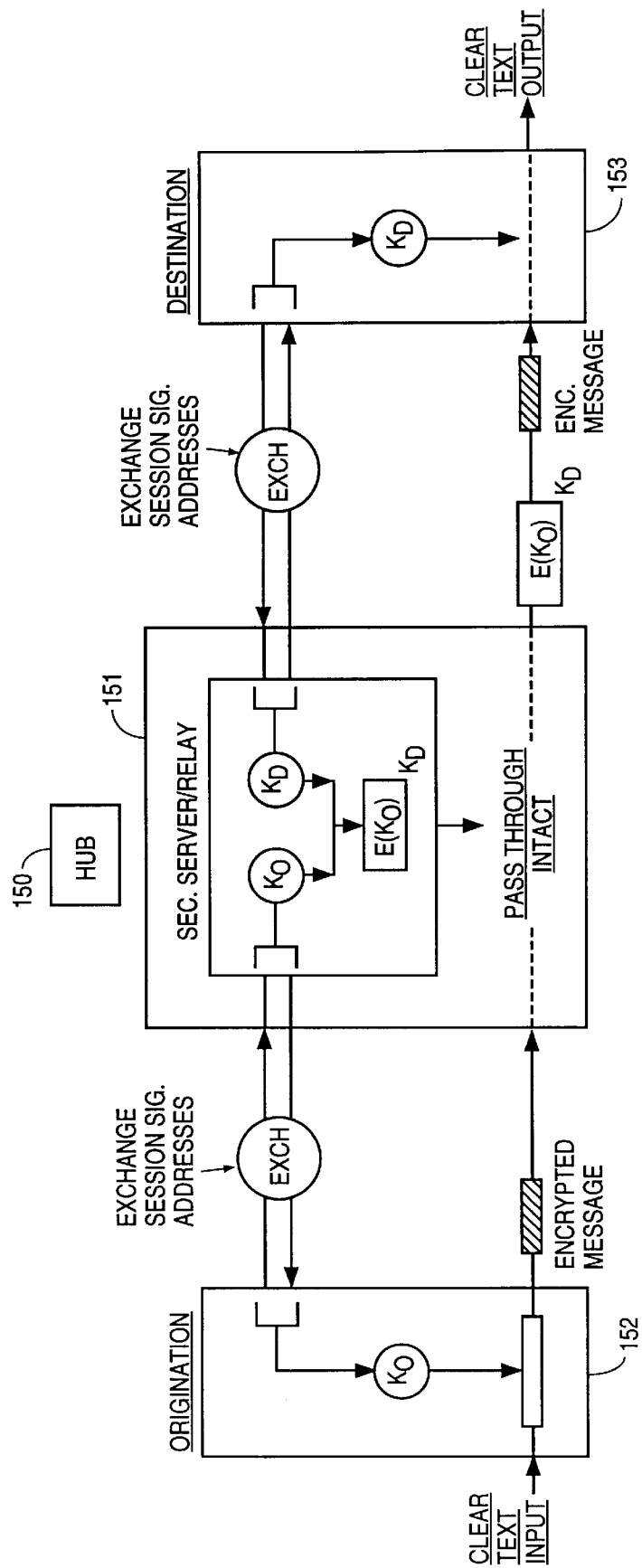
FIG. 15 illustrates the security process for communication on the Internet between users registered with one network computer hub using a high performance option where messages are encrypted only once and decrypted only once.

FIG. 15 illustrates a security process for communicating in accordance with this invention on the Internet between users registered with one network computer hub. Illustrated in FIG. 15 is the high performance option where messages are encrypted only once and decrypted only once. As shown in FIG. 15, a message originates at side 152. This message is encrypted with a session key derived from the secure server/relay 151 in a manner described above in conjunction with, for example, FIGS. 4A or 4B, 5, or 7. The exchange of session signature addresses can be bi-lateral when the symmetric mode is used wherein secure server/relay 151 and the originating side 152 each contribute to the combined session signature. The session signature is then passed through a session-signature-to-session-key converter to generate a session key KO for use by the origin 152. The session key KO is then used in the manner described above to produce an encrypted message which is transmitted to the security server/relay 151. Meanwhile, the security server/relay 151 has simultaneously contacted the destination side 153 and in the symmetric mode has exchanged session signature addresses with destination side 153 such that both the destination 153 and the security server/relay 151 have developed a composite session signature for use in transmitting a secure message between security sever/relay 151 and destination 153. This composite session signature is then passed through a session-signature-to-session-key converter to yield the session key KD for use in encrypting messages to be transmitted between the security server/relay 151 at hub 150 and the destination 153.

In accordance with one mode of operation, the encrypted message from origination 152 is received by security server/relay 151 and there decrypted, and then re-encrypted using the session key KD unique to the destination 153. The re-encrypted message is then transmitted directly to the destination 153 where the session key KD is used to decrypt this message and produce a clear text output. This technique however involves an intermediate decryption and re-encryption. This decryption and re-encryption slows down the transmission slightly and can be avoided by another technique unique to this invention. Security server/relay 151 can take the session key KO used by the origin 152 and encrypt it using the session key KD. Signal E(KO)KD is then transmitted as a trailer to the encrypted message from origin 152 when this encrypted message is passed through security server/relay 151 intact and transmitted directly to destination 153. The destination 153 will then detect the receipt of an encrypted message followed by a trailer containing an encrypted session key KO to be used in decrypting the transmitted encrypted message. The destination 153 uses session key KD to decrypt the encrypted session key KO to obtain session key KO which it uses to decrypt the encrypted message transmitted from origin 152.

This technique transmits the encrypted session key KO from hub 151 to destination 153. Should the unencrypted session key KO somehow be obtained by an unauthorized user, the consequences are not catastrophic because the particular session key KO will not be used again in the transmission of any message. Indeed this particular session key KO will be discarded by the destination 153 as well as by the origin 152 and by the secure server/relay 151 upon completion of the transaction.

Figure 16:
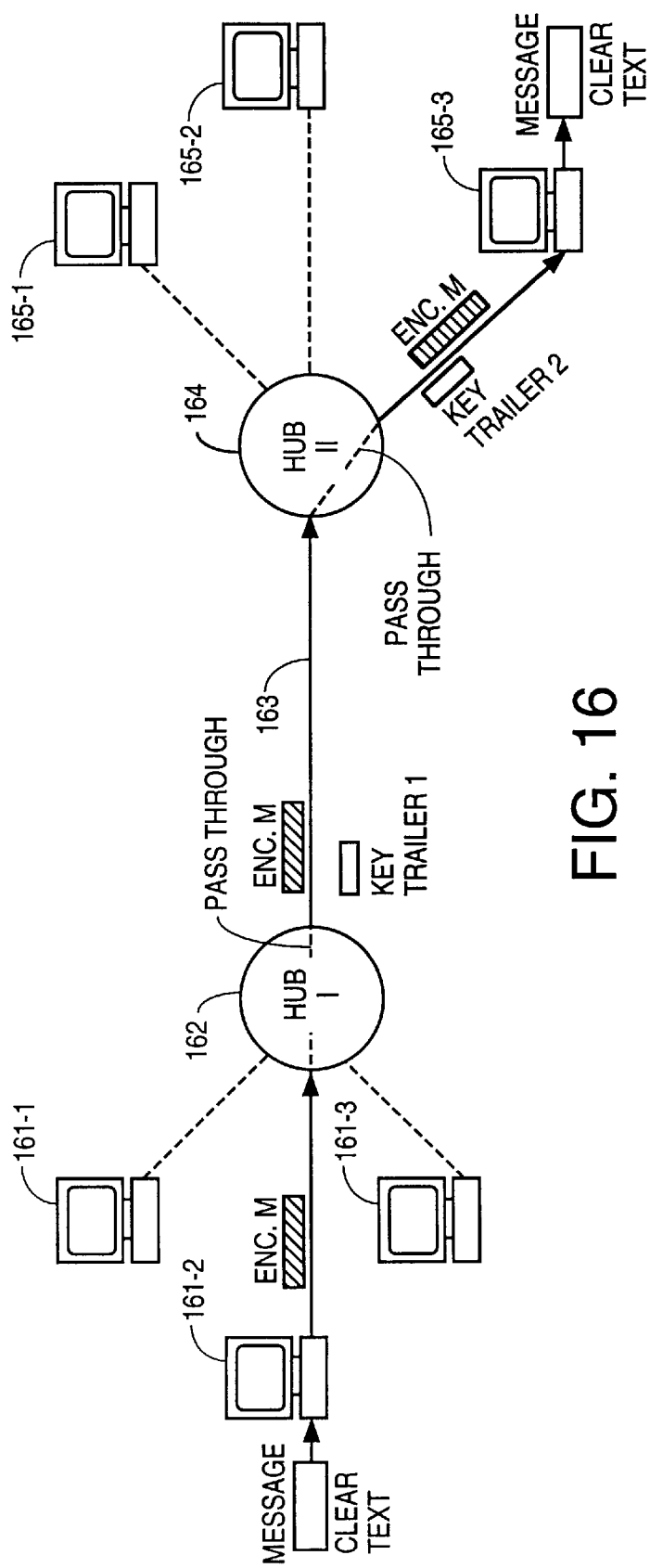
FIG. 16 shows the securing of a communications session between two users each registered with a different hub wherein a message is encrypted at the point of origin and flows intact until final destination where it is decrypted. Note the use of a key trailer generated at hub one and relayed to hub two where it is converted to a second key trailer and relayed to the destination terminal.

FIG. 16 illustrates a secure communication session between two users each registered with a different hub. As shown in FIG. 16, hub 162 is connected by an insecure transmission path 163 to hub 164. Connected to hub 162 are users 161-1, 161-2 and 161-3. Connected to hub 164 are users 165-1, 165-2 and 165-3. Should the user at terminal 161-2 (which might, for example, be a digital telephone or a data transmission modem associated with a PC or any other communication equipment such as a facsimile or financial credit card modem) desire to transmit a message to a user connected to hub 164, then the clear text message input to terminal 161-2 is encrypted in accordance with any one of the techniques described above. The encrypted message is then passed to hub 162 where the message can be decrypted and then re-encrypted using a session signature uniquely developed between hub 162 and hub 164 in any one of the manners described above. The re-encrypted message can then be transmitted to hub 164 on insecure network 163 where the message is decrypted and re-encrypted using a session signature generated by hub 164 and the message destination 165-3. This technique can be greatly simplified however by employing a technique similar to that described above in conjunction with FIG. 15 wherein the encrypted message from origin 161-2 is received at hub 162 and passed intact through hub 162 followed by a key trailer 1. Key trailer 1 is the session key (denoted "KO"), generated between origin 161-2 and hub 162, encrypted by the session key (denoted "K(I-II)", generated between hub 162 and hub 164. At hub 164, received trailer 1 is decrypted resulting in KO which is re-encrypted using the session key (denoted "KD") associated with hub 164 and destination 165-3. The result is trailer 2, which is session key KO encrypted by the session key KD associated with hub 164 and destination 165-3. The destination 165-3 receives the encrypted message and the key trailer 2. The destination 165-3 decrypts key trailer 2 to obtain the session key KO with which the received encrypted message has been encrypted at its origin, 161-2. Session key KO is then used by destination 165-3 to decrypt the message and obtain a clear text message. Naturally, this technique can be used to transmit an encrypted message from an origin to a destination through any number of hubs desired. The only overhead is that associated with the requirement to decrypt and re-encrypt the key trailer at each hub so that the original session key KO associated with the encrypting of the message is capable of being obtained at the destination.

An important advantage of the use of a hub is that the hub knows, and can authenticate, the identity of the sender. The receiver has no way of knowing that a sender is who the sender says he or she is. But the hub authenticates the sender by sending to the sender the addresses of the bytes in a session signature derived at the hub from an access signature stored at the hub but derived from the sender's master signature. The sender encrypts a challenge number from the hub using the session signature derived by the sender from the sender's master signature using the session signature addresses received from the hub. If the hub receives back from the sender the same challenge number as sent by the hub to the sender, the sender has been authenticated by the hub and the hub knows with certainty the identity of the sender. The hub can then send to the receiver a trailer containing not only the sender's session key but also the sender's I.D. Thus, the trailer to be sent by the hub to the receiver becomes E[KO+Sender I.D.] KD. The hub can also provide to receiver an authenticated time stamp by including in the trailer the date and time of the transmission. The trailer to be sent by the hub to the receiver becomes E[KO+Sender I.D.+Date/Time] KD.

FIG. 17 illustrates various configurations where the tri-signature system of this invention can secure for all applications on the Internet requiring security or privacy. In FIG. 17A, two or more network computers are linked through the Internet. Each pair of network computers can communicate through the Internet using the tri-signature security system and method of this invention.

Figure 17A:
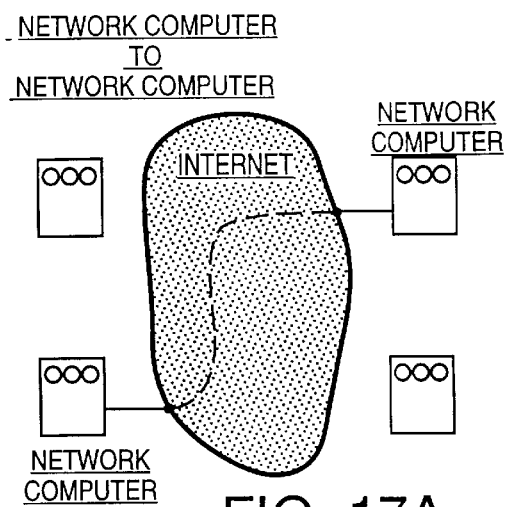
FIG. 17 illustrates various examples of Internet applications which can be readily secured by the tri-signature security system of this invention.
Figure 17B:
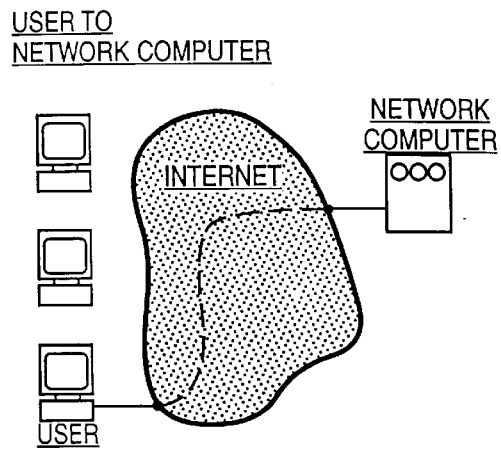

In FIG. 17B, a number of users are interconnected to a network computer through the Internet and each user can securely communicate with the network computer and vice-versa using the tri-signature security methods and systems of this invention.

Figure 17C:
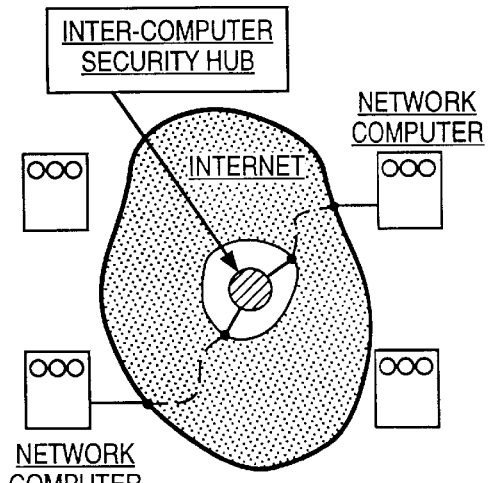

In FIG. 17C the Internet network utilizes an intercomputer security hub of the type shown, for example, in FIG. 12. Network computers communicate through the Internet using the intercomputer security hub as an intermediate point on the communication channel. The intercomputer security hub is capable of acting like a communication hub as shown, for example, in either FIG. 15 or FIG. 16 in either decrypting and re-encrypting the message or encrypting the session key associated with the origin of the message to allow the destination to decode the encrypted message using the origin's session key, without any intermediate message description/re-encryption.

Figure 17D:
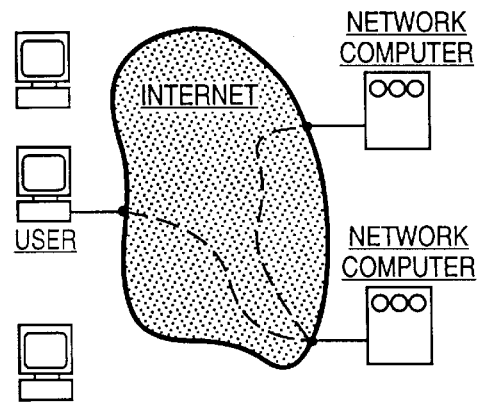

FIG. 17D utilizes the Internet and a plurality of user terminals together with two or more network computers. The communication between a user and a given network computer can involve an intermediate network computer or can go directly to a network computer. Both configurations are shown in FIG. 17D. The intermediate network computer will again function much like the hub or hubs shown in FIG. 15 or 16 to either decrypt and then re-encrypt the message being transmitted onto another network computer or to merely encrypt the session key from the origin with the destination session key to allow the destination to use the origin's session key to decrypt the message.

Figure 17E:
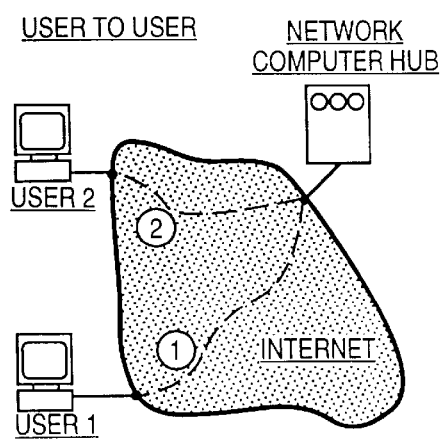

FIG. 17E illustrates the use of this invention to allow user 1 to communicate directly to user 2 using the network computer as a hub. Again, the message encrypted at user 1 can be decrypted and re-encrypted at the network computer prior to transmission to the destination, user 2, or the network computer can act as a hub to encrypt the session key KO associated with the origin of the message using the destination's session key KD to allow the origin's session key KO to be transmitted in encrypted form to the destination and there be used by the destination to decrypt the transmitted message.

Figure 17F:
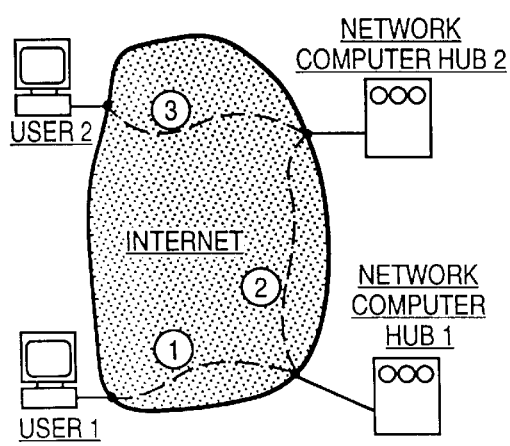

FIG. 17F illustrates the communication between user 1 and user 2 through two computer hubs. Thus, there are three channels on the Internet used to transmit a message from user 1 to user 2: channel 1 between user 1 and network computer hub 1, channel 2 between network computer hub 1 and network computer hub 2 and channel 3 between network computer hub 2 and user 2. The message being transmitted from user 1 to user 2 will be encrypted using the session key generated for link 1. Hub 1 can then decrypt and re-encrypt this message using the session key for link 2 and hub 2 can then decrypt and re-encrypt this message using the session key for link 3. Alternatively, hub 1 can merely encrypt the session key associated with link 1 using the session key associated with link 2 and transmit encrypted link 1's session key to hub 2. Hub 2 will then decrypt the encrypted session key for link 1 and re-encrypt the session key for link 1 using the session key for link 3 and then transmit the re-encrypted session key for link 1 to the destination so that the destination can decrypt the received message using the session key for link 1.

Figure 18:
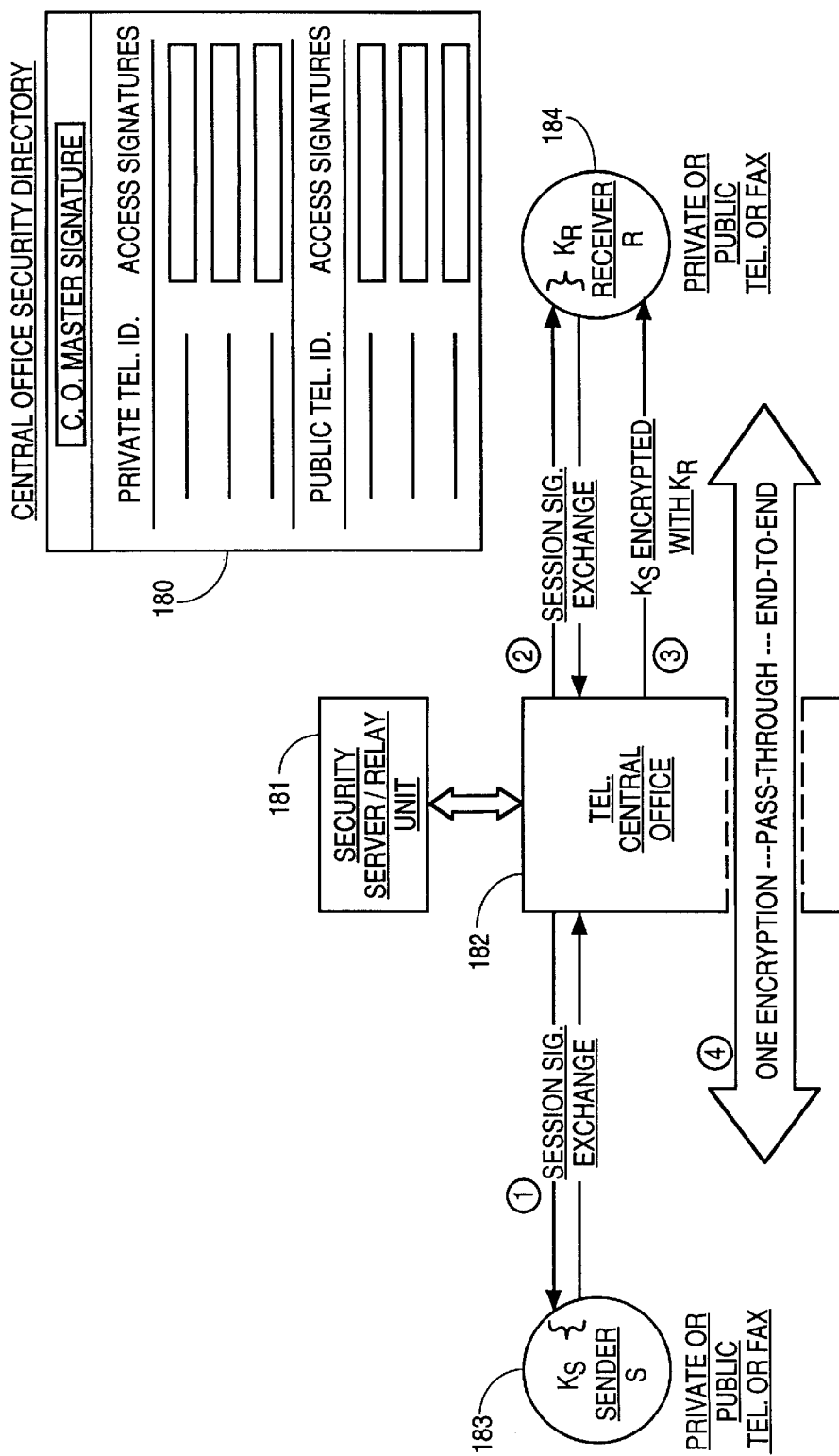
FIG. 18 shows the process for setting up a secure telephone call session wherein once the sender and receiver sets are security synchronized, the encryption/decryption is end-to-end and the secured call simply passes through the central office without any intervention.

FIG. 18 illustrates a secure telephone call session using the principles of this invention. The use of this invention to secure and transmit digitized telephone messages is identical to the use of this invention to secure and transmit any other digitized data. The only distinction is that the telephone central office acts in the same way as the hub in the system shown in FIG. 15. The telephone central office 182 has added to it the security server/relay 181 of the type shown in FIG. 12. The security server relay unit 181 contains the information relating to the access signatures of the various subscribers to the telephone central office and has the ability to select a session signature from the access signature in the manner described above in conjunction with, for example, FIGS. 4A, 4B, 5 or 7. Thus, a sender 183 desiring to establish a secure call to a receiver 184 will transmit a request signal, sender's I.D. and receiver's I.D. to the telephone central office 182. The telephone central office 182 will access the security server relay 181 which contains within it the information depicted in block 180. This information includes the telephone I.D. of the sender (whether private or public telephone) and the access signature associated with that telephone. In addition, the security server relay unit 181 also has the access signature of the receiver, corresponding to its I.D. The telephone central office 182 will then exchange with the sender 183 respective addresses of the bytes in the session signature to be used for securing the to-be-made call. Thus, both central office 182 and sender 183 have identical session signatures, and an identical session key KS. Meanwhile, a similar process is followed between the central office 182 and the receiver 184 and both will have an identical session key KR. Now, there are two alternative methods of operation. The first involves real-time call decryption-encryption at the central office 182; and the second involves only the encryption of the sender's key by the receiver's key during call set-up and no urther involvement by the central office 182 during the call. This second alternative is the preferred one for real-time telephone applications. Thus, in accordance with this invention, call encryption and decryption is performed only at sender 183 and receiver 184 sets, while simply passing through the central office 182 without any security manipulation at the central office. Thus, once the sender 183 and receiver 184 are synchronized by security server/relay at the central office 182, the secure call session is truly end to end.

Naturally, the method depicted in FIG. 18 can be extended to a plurality of central offices interposed between the sender and the receiver much as described above in conjunction with the use of two hubs 162 and 164 in FIG. 16.

In the structure of FIG. 18 the central office 182 is provided with a tri-signature security server/relay unit. In addition, each telephone set (or fax or other equipment using the telephone system) is provided with a security processor. As described earlier, the security server is assigned a master signature and each terminal (i.e., telephone) is assigned a master signature. The central office server/relay distributes an access signature to each terminal and retains in file an access signature generated from each terminal's master signature. In FIG. 18 is shown the corresponding security directory. As described above the following process is followed to implement this invention on the telephone system.

1. Each telephone set, and the security server/relay unit 181 at the central office 182 exchange session signatures.

2. Secure calls can now be provided between any two sets.

3. In establishing a secure connection, a sender 183 session key KS is established and a receiver 184 session key KR is established. The security server 181 has both KS and KR.

4. The security server 181 encrypts KS with KR and sends the encryption result to the receiver 184. Now the receiver 184 can decrypt using KR and obtain KS. The sender 183 and receiver 184 are now synchronized and the central office security server/relay 181 is disengaged.

5. Sender 183 and receiver 184 now can communicate securely with no further involvement of the security server 181 or the central office 182 (other than maintaining the connection).

The telephone network applications secured by the tri-signature security system are seen to operate in essentially the same manner as for applications on other communication networks such as the Internet. In fact, the techniques of this invention are directly applicable to all digital communications and will also apply to all analog systems when digitized. In addition, all media including multimedia communications can be encrypted using the techniques of this invention.

The basic tri-signature system as described for application to the Internet is, as seen above, directly applicable without any basic change, to the telephone network. The tri-signature security system applies to conventional systems, wireless, and cellular systems. The telephone sets to be used with this tri-signature system require a security function addition which provides the user with the option of securing outgoing communications and the ability to receive secured communications. The present telephone central offices or switching offices also will need to be equipped with tri-signature security service/relay units and perform the security-hub functions precisely as described for the Internet. Telephone services with security provisions added include private telephones with provisions to select security for any communication and an optional personal security lock out. Public telephones can also have a provision for selecting security. Cellular telephones are particularly appropriate for using the security option. In addition, faxes, picture phones and telephone conferencing can use the security system of this invention.

Figure 19:
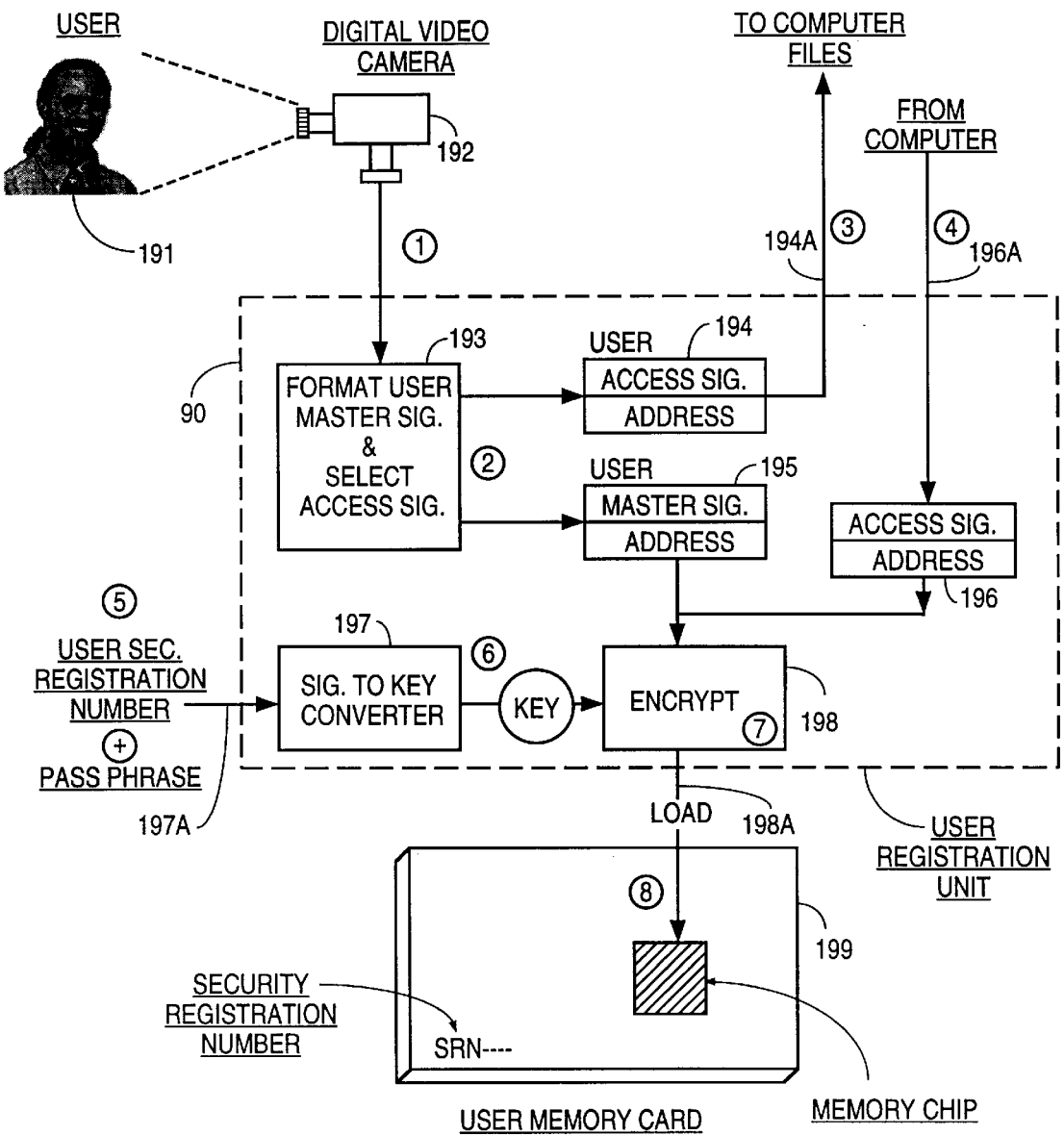
FIG. 19 shows users security registration for the video image system. In one process, a user's digitized video images and other signatures are encrypted and placed in the user's video card, and a card is issued ready for use.

FIG. 19 shows the tri-signature security registration system and the underlying process for the secure registration of users, as an embodiment of the invention. The system is of general applicability. In FIG. 19, one specific application is demonstrated showing the registration of new users with a network computer, such as at a bank, and the simultaneous issue of video image based I.D. cards (Video Card). A user 191 is photographed by a digital video camera 192. The digital video camera 192 can produce one frame image of the user for static image display or a sequence of frames for a live video image. The digital video camera 192 transmits the digital data representing the image of the user to a formatter 193 which formats the user's image into a master signature unique to use with an address for each byte. From this master signature an access signature is randomly selected and is transmitted with the byte addresses 194 in the master signature on I/O bus 194A for file storage at the network computer where the user is being registered. In addition, the user enters the unique security registration number that has been assigned to him, and his secret pass phrase into the registration unit using a standard interface unit such as a keyboard through I/O port 197A. This secure registration number and the pass phrase are processed through a signature-to-key converter 197 to generate a key for the protection of signature by encryption in unit 198. The encrypted master signature is then loaded into the memory chip in a user's video card 199 through I/O port 198A. The user memory card 199 also contains the security registration number ("SRN") of the user. In addition, from the computer is received a computer access signature 196 and the corresponding byte addresses on I/O port 196A. These access signature bytes and corresponding addresses are also passed through encryption unit 198 where the main computer's access signature 196 is encrypted using the same pass phrase-generated key. The encrypted computer's access signature then is also loaded onto the memory chip. Thus, the user memory card 199 is capable of being used in the symmetric mode of operation of this invention where both user and computer jointly participate in creating a common session key.

The I.D. video card and system illustrated in FIG. 19 has an important additional function which is of particular value to many commercial, business and government applications. The system makes it possible to provide positive identification of an individual, while simultaneously confirming the authenticity of the card; i.e., it is not a counterfeit.

Examples of applications of the I.D. video card are: physical access to facilities, payment at point of sale and in person banking. For government, applications include: delivery of welfare services, social security payments, immigration, passport, law enforcement and motor vehicle services. The I.D. video card represents a secure and practical means for providing a national identification card. In the system in FIG. 19, the user enters a secret pass phrase. This is used to encrypt (scramble) the video image before loading in the video card 199. The card 199 cannot be used to display the image of the user without the user entering his or her secret pass phrase. This means that using the video card to identify its owner cannot be done without the user's consent. This feature may play an important role for the acceptance of the concept of a national I.D. card.

In FIG. 19 the users registration unit 90 is physically secure with a tamper proof case. The user security registration system 90 would have secure communication with the service center hub computer. In summary, to generate the master signature from the image of the user the following procedure is followed.

1. The user's video picture is taken and the digital content of one frame is delivered to the registration unit 90. Alternatively several sequential frames can be delivered to the registration unit 90 if desired.

2. The digital video image data is formatted into the master signature of the user. From this master signature, an access signature is randomly selected.

3. The access signature of the user is transmitted to the computer for file storage under the user's unique security registration number (SRN).

4. The computer returns an access signature which the computer has randomly generated from the computer's master signature specifically for the user. This access signature allows the user memory card 199 to be used in the symmetric mode of operation of this invention.

5. The SRN (the user security registration number) and the user's personal pass phrase are entered. While the use of the pass phrase is highly recommended, the use of the pass phrase is optional and there are applications where it may not be necessary.

6. The signature-to-key converter 197 produces an encryption key.

7. The encryption key is used to encrypt both the user's master signature and the computer's access signature.

8. The encrypted results are loaded into the memory chip of a new blank I.D. video card 199 which is issued to the user with the user's security registration number encoded on the memory card 199. At this point the card 199 is immediately ready for use.

Figure 20:
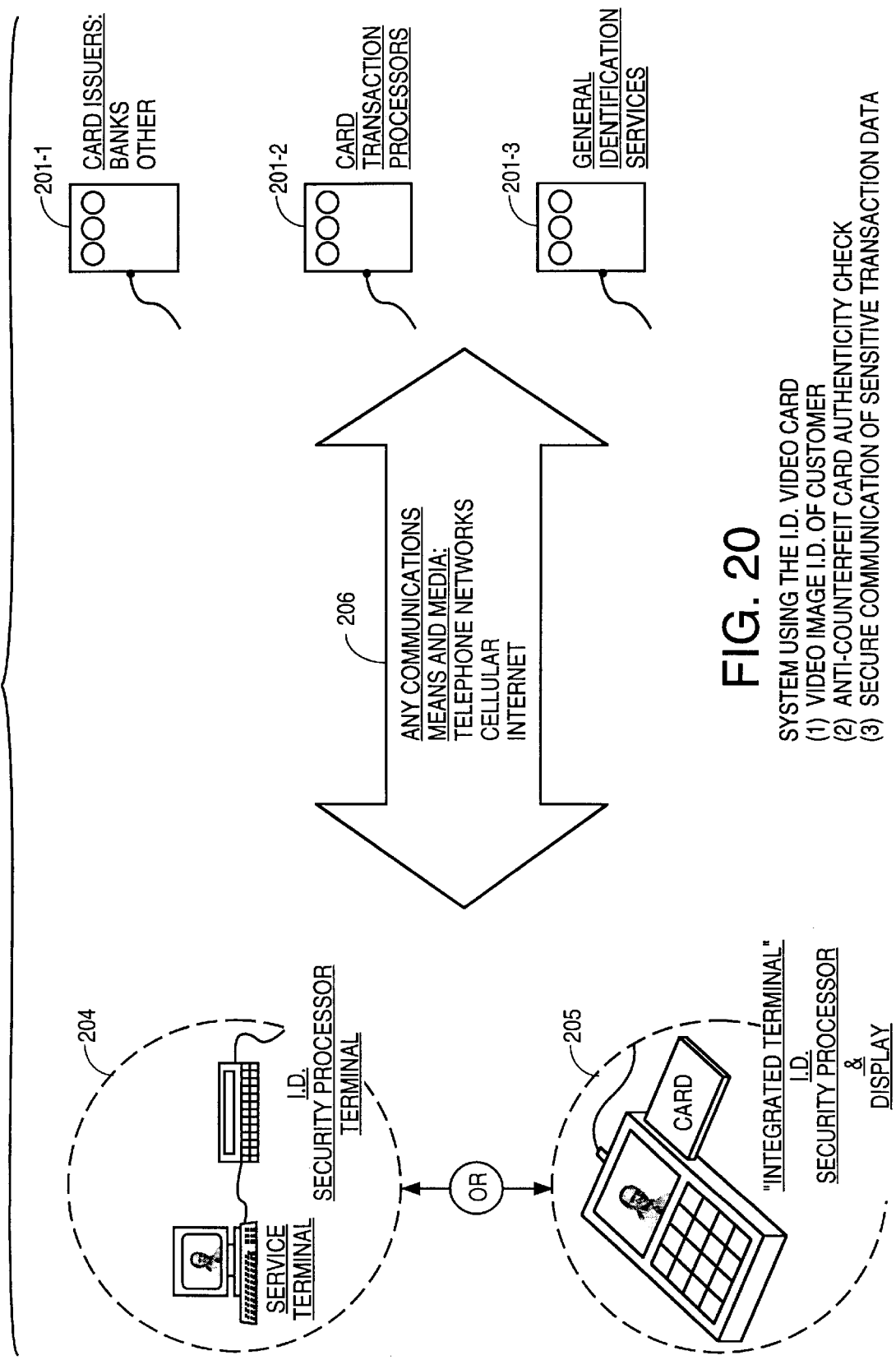
FIG. 20 shows the system using an I.D. video card which has a video image of a customer, allows the card authenticity to be checked to catch counterfeit cards and allows the secure communication of sensitive transaction data from one side to another side of the network.

FIG. 20 illustrates the way in which a user will use the I.D. video card 199 generated in accordance with this invention, using, for example, the system of FIG. 19, for identification as well as for secure communications. In the system of FIG. 20, a card is issued by, for example, a bank or other financial institution such as a savings and loan association, a credit union or a brokerage house 201-1. Also, a card can be issued by card transaction processing companies 201-2 which can authorize transactions, issuers of non-bank cards and companies issuing private charge cards. Also, government agencies 201-3 such as welfare, social service or social security agencies would use a card of this type for identification purposes. A video I.D. card 199, once issued, has all the information necessary to identify the user and to allow the user to communicate securely on any available communication means or media such as telephone networks, cellular telephone systems, or computer networks private or public such as the Internet. By inserting the user card 199 in a user terminal 204, the terminal 204 can display the stored image of the user allowing the individual providing the service to identify the holder of the card.

If in issuing the I.D. Video Card 199, a user pass phrase is used, then when the card is placed in a terminal, the video image stored in the card cannot be displayed until the user enters the correct pass phrase.

Even if a card is presented for service and a pass phrase is entered, and an image is displayed matching the card holder, there is still the possibility that the card is not authentic but is counterfeit.

By applying the tri-signature security process of this invention, this card counterfeit problem is completely eliminated. As described in a previous section and FIG. 19, the user registration process provides the necessary counterfeit measure.

At user registration, the user's master signature and an access signature received from the computer are placed in the card, while a user access signature, obtained from the user's master signature, is placed at the network computer with the user's security registration number (SRN). This relationship between security data on the card and security data at the computer provides a powerful on-line capability for positive proof of authenticity of a card when used and hence eliminates counterfeit cards. Other than its image identification feature and the video image-generated master signature, the video card system is identical in all respects in terms of applicability and performance as described earlier for the system utilizing the random-generated master signature.

FIG. 20 thus illustrates the total system utilizing an I.D. security processor attached to a service terminal 204 (such as a cash register) which displays the user's video image for comparison with the user and a complete self-contained portable unit with its own video screen. By communicating with the network computer, the system provides the ability to instantly check the user's card authenticity (and to detect counterfeits), secures the transaction communications, and issues I.D. confirmation and transaction authorization.

For a positive identification using the video card, three requirements must be met:

(1) The correct user pass phrase (if one is used) must be entered to allow the unscrambling of the video image and its display on the screen.

(2) the image on the screen must visually match the user.

(3) the card authenticity must be verified by communicating with the network computer. The procedure steps for verifying the authenticity of the card are as follows:

(a) using the symmetrical tri-signature system, terminal and computer exchange session signature addresses. Now each derives the same session key and hence are synchronized.

(b) A random challenge number is issued by the computer, and received by the user terminal. This challenge number is encrypted by the terminal using the session key and the result is returned to the computer.

(c) The computer decrypts and compares the challenge number received with the challenge number it issued. If the two are the same, the user card is authentic.

(d) A match of the sent and received challenge numbers is proof of authenticity. The computer sends back an encrypted confirmation number and user I.D.

(e) The terminal decrypts and records the confirmation number.

The user identification and transaction execution with an I.D. video card follow the same steps as just described in 1, 2, and 3 above associated with FIG. 20. At this point, the user pass phrase has been confirmed, the visual match is made and the terminal and computer are synchronized with the same session key. The transaction execution then is as follows:

(a) The sender's terminal encrypts the transaction message: either a whole message encryption or partial encryption of only the sensitive elements of the message such as credit card number and dollar amount.

(b) The result is transmitted to the computer.

(c) The computer decrypts the received message. If the results are meaningful the computer confirms both the card authenticity and the message integrity.

(d) The computer returns an encrypted confirmation which includes a transaction authorization number.

(e) The terminal decrypts and records the authorization number.

Many products including subsystems and components can incorporate the tri-signature security system for many diverse applications in the network communications field. Among these are:

1. User PC DISKETTE containing user's master signature and network computers access signatures.
2. User MEMORY CHIP CARD with the same contents as the diskette, to use with public services terminals, and PC's with card receptacles.
3. User VIDEO CARD with same contents as above but with the ability to deliver data to display user's video images for applications requiring visual I.D. of user.
4. PC APPLICATION PROGRAMS to allow user's PC to participate in all network services which have been secured by the Tri-Signature Security System.
5. "SECURITY SERVER CHIP SET" (Tri-Signature processing chip set) to perform critical security functions at all types of user terminals: PC, POS, telephone, fax, for example.
6. NETWORK COMPUTER "SECURITY SERVER" (a self-contained computer) to provide networks operating on the Internet with "FIREWALL" protection and secure communication with users and with other network computers.
7. NETWORK COMPUTER "SECURITY SERVER/ RELAY" (also a self-contained computer) to allow a network computer to operate as a NETWORK SECURITY HUB for securing communications between users, between users and network computers, and between network computers and network computers.
8. VIDEO CARD USER TERMINALS (these are mostly publicly used terminals) to provide visual image identification of user as well as secure transaction communications on the Internet.
9. TRI-SIGNATURE APPLICATION TOOLS to allow integration in application programs of the tri-signature security system requiring network security.

An alternative embodiment of this invention which is usable with each of the systems described above provides a method to enhance substantially the security of the encryption key. While it is extremely unlikely that an individual will be able to determine the master signature or the access signature of a particular user from captured transmitted information, this alternative embodiment makes it even more difficult, if not impossible. Simply, it does not allow even the signature addresses to be transmitted without prior encryption. This alternative embodiment makes it even more practical to use simplified and more efficient security procedures and to utilize extremely simple and fast encryption methods throughout the system. In this alternative embodiment, the receiver in possession of the access signature of the sender selects two sets of session signatures from the access signature. The receiver then uses the bytes in the first session signature to encrypt the addresses of the bytes in the second session signature. The receiver then transmits two sets of information to the sender. The first set is the addresses of the first session signature and the second set is the addresses of the second session signature encrypted with the bytes in the first session signature. The sender then uses the addresses of the first session signature to identify and assemble the bytes from the master signature which comprise the first session signature and uses the first session signature to decrypt the second set of information to determine the addresses of the bytes in the second session signature. The bytes in the second session signature now become the bytes used to secure the subsequent communications between the sender and the receiver until discarded. Since the addresses of the bytes in the second session signature have not been transmitted in clear text, it becomes feasible to use the bytes in the second session signature to directly encrypt the information to be transmitted. This eliminates the need for the session signature-to-key converter, a simplification which reduces the time required to change keys.

While the invention has been described as being implemented between a user and a network computer or a user and a receiver, or a sender and receiver, or a user and a hub, or a hub and a receiver, this invention can equally be used for securing transmission of digital messages from one hub to another hub in a computer network, or from one central office to another central office in a telephone system. This invention is capable of being used any time a message is being sent from a first place to a second place using digital techniques regardless of the nature or configuration of the intervening network.

An alternative embodiment of this invention can use a smaller master signature at the sender and use this master signature at the receiver as an access signature. A session signature would then be derived from this access signature as described above. In general, however, the master signature of a sender will be larger than the access signature because a larger master signature will:

1. Allow a sender to communicate with a large number of receivers, each receiver storing a unique access signature derived from the sender's master signature;

2. Give the user room to change the user's access signature at one or more receivers and as frequently as desired; and 3. Make use of all the bytes required to reproduce an image of the user (since the bytes representing a video image of the user are available, the master signature might as well use them).

The above descriptions are exemplary only and not limiting. Other embodiments of this invention will be obvious in view of the above disclosure. In particular, those skilled in the art will recognize that this invention is particularly suitable for implementation using microprocessors and appropriate software.

What is claimed is:

1. A method for securing transmission of information from a sender to a receiver, which comprises:

providing at the sender a unique sequence of bits associated with a sender;

providing at the receiver a first subset of bits selected from said unique sequence of bits;

generating at the receiver from said first subset of bits a second subset of bits for use in encrypting the information;

identifying at the sender the second subset of bits by means of addresses sent from the receiver to the sender;

encrypting at the sender the information to be transmitted using said second subset of bits; and transmitting the encrypted information from the sender to the receiver.

2. The method of claim 1 including:

decrypting at the receiver the received encrypted information using the second subset of bits, wherein the bits used to encrypt the transmitted message are not sent between the sender and the receiver.

3. The method of claim 2 including before said encrypting:

converting, at both said sender and receiver, said second subset of bits to an encryption key by use of an irreversible algorithm.

4. The method of claim 3 wherein said unique sequence of bits represents a master signature, said first subset of bits represents an access signature and said second subset of bits represents a session signature.

5. The method of claim 4 including:

changing said access signature by selecting at the user from the user's master signature a new subset of bits to replace said first subset of bits;

encrypting said new subset of bits using said first subset of bits;

transmitting said encrypted new subset of bits to said receiver;

decrypting said new subset of bits at said receiver using the access signature already present at the receiver for said decryption; and replacing at the receiver the first subset of bits representing the original access signature with the new subset of bits so as to form a new access signature.

6. The method of claim 5 including:

identifying addresses in said master signature of the bits in said new subset of bits;

encrypting these addresses of the new subset of bits using the first subset of bits;

transmitting the encrypted addresses of said new subset of bits to the receiver;

decrypting the encrypted addresses of the new subset of bits at the receiver; and storing at the receiver said addresses of the new subset of bits together with the new subset of bits to form the access signature.

7. The method of claim 1 wherein said unique sequence of bits is made up of a unique set of bytes and each byte has associated therewith a unique address.

8. The method of claim 7 wherein the first subset of bits comprises a first subset of bytes, each byte in said first subset having a corresponding address, each byte in said first subset corresponding to a byte in said unique set of bytes and having the same address as the corresponding byte in said unique set of bytes.

9. The method of claim 8 wherein the second subset of bits comprises a second subset of bytes selected at said receiver from said first subset of bytes, each byte in said second subset having a corresponding address, each byte in said second subset corresponding to a byte in said unique set of bytes and having the same address as the corresponding byte in said unique set of bytes.

10. The method of claim 9 wherein the step of identifying said second subset of bits at the sender comprises:

sending the addresses of said second subset of bytes to the sender to allow the sender to identify the bytes in the second subset of bytes by their addresses in said unique set of bytes.

11. The method of claim 10 including the step of obtaining, at both said receiver and said sender, an encryption key from the second subset of bytes.

12. The method of claim 11 wherein the step of obtaining an encryption key from the second subset of bytes comprises:

converting, at both said receiver and said sender, the second subset of bytes to an encryption key using an irreversible algorithm.

13. The method of claim 11 including the steps of:

encrypting said information at said sender using said encryption key; and decrypting said encrypted information received at said receiver also using said encryption key.

14. The method of claim 13 wherein the step of encrypting said information comprises:

holding a selected number of bits of the data to be encrypted in a first data register, said selected number of data bits being equal to the number of bits in the encryption key;

holding the bits in the encryption key to be used to encrypt the data in an encryption register;

simultaneously passing the bits in the first data register and the bits in the encryption register through a selected number of exclusive OR gates, a given bit of data in the data register and the corresponding bit from the encryption key in the encryption register being passed through a corresponding exclusive OR gate to produce an encrypted data bit; and storing the encrypted data in an encrypted data register.

15. The method in claim 14 wherein the step of decrypting said encrypted information received at said receiver comprises:

storing said selected number of bits of the received encrypted data in an encryption data register;

storing the encryption key in an encryption register, said encryption register having the same number of bits as the encrypted data stored in said encryption data register; and simultaneously passing the bits stored in said encryption data register and the bits stored in said encryption key register through a plurality of exclusive OR gates, one bit each from the encryption key register and the encryption data register going simultaneously through a corresponding exclusive OR gate to produce a decrypted data bit; and storing the resulting decrypted data in a decrypted data register.

16. The method of claim 13 including:

encrypting the unique set of bits at said sender with a third set of bits unique and known only to the sender to protect the unique set of bits.

17. The method of claim 16 including:

changing said third set of bits by substituting a fourth set of bits unique and known only to the sender for said third set of bits;

said step of changing including the steps of:
  decrypting the unique set of bits using said third set of bits; and
  re-encrypting the unique set of bits using said fourth set of bits.

18. The method of encrypting a message to be transmitted from a sender to a receiver which comprises:

generating a master signature associated with the sender, said master signature comprising a plurality of bytes of information, each byte being represented by a unique address;

providing at a receiver an access signature, said access signature comprising a first subset of the bytes making up the master signature, the bytes in said first subset of bytes having associated with them their addresses in the master signature;

generating at the receiver a session signature, said session signature comprising a second subset of bytes from the access signature, said second subset of bytes having associated with them their addresses in the master signature;

transmitting the addresses of said second subset of bytes to the sender thereby to allow the sender to identify from the master signature said second subset of bytes; and using said second subset of bytes to encrypt the message at the sender and when the encrypted message is received at the receiver, to decrypt the received message at the receiver.

19. The method of claim 18, wherein the step of using said second subset of bytes to encrypt the message at the sender and to decrypt the received message at the receiver comprises:

deriving an encryption key at both said sender and said receiver from said subset of bytes;

encrypting at the sender the message to be sent to the receiver using said encryption key;

sending said encrypted message to the receiver; and decrypting the received message using the encryption key originally generated at the receiver, whereby the second subset of bytes from which the encryption key is derived is never transmitted between the sender and the receiver.

20. The method of generating an encryption key for use in encrypting information to be transmitted from a sender to a receiver which comprises:

generating a master signature associated with a sender;

storing at the sender the master signature associated with the sender, said master signature containing a first plurality of bytes of information, each byte being identified by a unique address;

storing at a receiver a first subset of bytes selected from said first plurality of bytes, the bytes in said first subset of bytes being identified by the addresses of said bytes in said master signature and being denoted as an access signature;

selecting at the receiver from the first subset of bytes a second subset of bytes, said second subset of bytes being randomly selected and being denoted as a first session signature, each byte in said second subset being identified by the same address as said byte had in the master signature to allow the identification of said byte in the master signature;

transmitting the addresses of said second subset of bytes from the receiver to the sender;

identifying at the sender from the master signature stored at the sender the second subset of bytes from the addresses transmitted from the receiver to the sender; and generating at both the sender and the receiver from said second subset of bytes a first encryption key using an irreversible algorithm, said first encryption key to be used in encrypting a message to be transmitted from the sender to the receiver.

21. The method of claim 20 wherein said step of generating comprises:

generating at both the sender and the receiver from said second subset of bytes a first encryption key using an irreversible algorithm.

22. The method of claim 20 wherein the receiver is a hub in a computer network.

23. The method of claim 20 wherein a second receiver is connected to said hub.

24. The method of claim 23 wherein information is to be transmitted from the sender to the second receiver through said hub, said method including the additional steps of:

generating and storing at the second receiver a second master signature associated with the second receiver, said second master signature containing a second plurality of bytes of information, each byte being identified by a unique address;

storing at said hub a third subset of bytes selected from said second plurality of bytes, the bytes in said third subset of bytes being identified by the addresses of said bytes in said second master signature and being denoted as a second access signature;

selecting at said hub from the third subset of bytes a fourth subset of bytes, said fourth subset of bytes being randomly selected and being denoted as a second session signature, each byte in said fourth subset being identified by the same address as said byte had in the second master signature to allow the identification of said byte in the second master signature;

transmitting the addresses of said fourth subset of bytes from the hub to the second receiver;

identifying at the second receiver from the second master signature stored at the second receiver the fourth subset of bytes from the addresses transmitted from the hub to the second receiver; and generating from said fourth subset of bytes at both the second receiver and the hub a second encryption key, said second encryption key to be used in encrypting a message to be transmitted from the hub to the second receiver.

25. The method of claim 24 including:

generating said second encryption key using an irreversible algorithm.

26. The method of claim 25 including:

encrypting information to be transmitted from the sender to the second receiver using the first encryption key;

transmitting the encrypted information from said sender through said hub to said second receiver;

encrypting at the hub the first encryption key using the second encryption key; and transmitting the encrypted first encryption key from the hub to the second receiver, there to be decrypted and used by the second receiver to decrypt the transmitted encrypted message received at the second receiver from the sender.

27. The method of claim 26 including:

passing said message being sent from said sender to said second receiver through a second hub;

encrypting the first encryption key at said first hub using an intermediate encryption key for transmission of information from the first hub to the second hub; and decrypting the first encryption key at said second hub and re-encrypting at said second hub the first encryption key with a second encryption key used for transmission of information between the second hub and the second receiver;

thereby to allow the message to be transmitted from said sender to the second receiver to pass through said first hub, said second hub and then to the second receiver and there be decrypted using the first encryption key.

28. The method of claim 20 including:

storing the first subset of bytes selected from said first plurality of bytes at both the sender and the receiver;

generating a first part of said second subset of bytes at the sender and a second part of said second subset of bytes at the receiver, and combining at both the sender and the receiver said first part and said second part to form said second subset of bytes at both the sender and the receiver.

29. A method for secure transmission of information from a sender to a receiver which comprises:

providing at the sender a master signature A comprising a plurality of bytes, each byte in the master signature A being identified by a corresponding address;

providing at the receiver a master signature B made up of a second plurality of bytes, each byte in said second plurality of bytes being identified by a unique address;

storing at the sender a first subset of bytes selected from the master signature B together with the addresses in the master signature B of the bytes in said first subset of bytes, said first subset of bytes being denoted as access signature B;

storing at the receiver a second subset of bytes selected from said master signature A together with the addresses in the master signature A of the bytes in said second subset, said second subset of bytes being denoted as access signature A;

generating at the sender from said first subset of bytes from the master signature B a third subset of bytes, said third subset of bytes being denoted as session signature B;

generating at the receiver from said second subset of bytes from the master signature A a fourth subset of bytes, said fourth subset of bytes being denoted as session signature A;

transmitting the addresses in the master signature B of the bytes in the third subset of bytes to the receiver;

transmitting the addresses in the master signature A of bytes in the fourth subset of bytes to the sender;

using the third subset of bytes to encrypt a message to be transmitted from the sender to the receiver; and using the fourth subset of bytes to encrypt a message to be transmitted from the receiver to the sender.

30. The method of claim 29 including:

combining said third subset of bytes and said fourth subset of bytes to form a combined session signature, said combined session signature being used to generate an encryption key for use in transmitting information from the sender to the receiver or vice versa.

31. The method of claim 30 including:

generating an encryption key using an irreversible algorithm on said combined session signature.

32. The method of providing an encryption key for use in securing transmission of information from a sender to a receiver which comprises:

selecting a subset of bits at a receiver from a set of bits located at both the receiver and the sender;

identifying the same subset of bits at the sender by transmitting the addresses of the subset of bits from the receiver to the sender; and deriving an encryption key from said subset of bits.

33. The method of securing the transmission of information from a sender to a receiver which comprises:

selecting, at the receiver, from a first set of bits located at both the receiver and the sender, a first subset of bits;

selecting, at the receiver, from said first set of bits located at both the receiver and the sender a second subset of bits, whereby the first subset of bits and the second subset of bits are identified by a first set of addresses and a second set of addresses, respectively;

encrypting, at the receiver, the addresses of the second subset of bits with the bits in the first subset of bits; and transmitting to the sender the addresses of the first subset of bits and the encrypted addresses of the second subset of bits;

thereby to allow the sender to encrypt the information to be transmitted from the sender to the receiver using the bits in the second subset of bits as determined by the sender from the addresses of the first subset of bits and the encrypted addresses of the second subset of bits transmitted from the receiver to the sender, the encrypted addresses of the second subset of bits being decrypted using the first subset of bits identified at the sender by their addresses.

34. The method of claim 33 including:

using, at the sender, the addresses of the first subset of bits to identify the bits in said first subset and then using the bits in said first subset to decrypt the addresses of the second subset of bits thereby to identify the second subset of bits.

35. The method of claim 34 including:

using, at the sender, the second subset of bits to encrypt the information to be transmitted to the receiver.

36. The method of claim 34 including:

using, at the sender, the second subset of bits to derive an encryption key using an irreversible algorithm, said encryption key being used to encrypt the information to be transmitted from the sender to the receiver.

37. Structure for securing transmission of information from a sender to a receiver, which comprises:

means for providing at the sender a unique set of bits associated with a sender;

means for providing at the receiver a first subset of bits selected from said unique set of bits;

means for generating at the receiver from said first subset of bits a second subset of bits for use in encrypting the information;

means for identifying at the sender the second subset of bits by means of the addresses of selected sroupings of bits in said second subset of bits sent from the receiver to the sender;

means for encrypting at the sender the information to be transmitted using said second subset of bits; and means for transmitting the encrypted information from the sender to the receiver.

38. The structure of claim 37 including:

means for decrypting at the receiver the received encrypted information using the second subset of bits, wherein the bits used to encrypt the transmitted message are not sent between the sender and the receiver.

39. The structure of claim 38 including:

means for converting, at both said sender and receiver, said second subset of bits to an encryption key by use of an irreversible algorithm.

40. The structure of claim 39 wherein said unique set of bits represents a master signature, said first subset of bits represents an access signature and said second subset of bits represents a session signature.

41. The structure of claim 37 wherein said unique set of bits is made up of a unique set of bytes and each byte has associated therewith a unique address.

42. The structure of claim 41 wherein the first subset of bits comprises a first subset of bytes, each byte in said first subset having a corresponding address, each byte in said first subset corresponding to a byte in said unique set of bytes and having the same address as the corresponding byte in said unique set of bytes.

43. The structure of claim 42 wherein the second subset of bits comprises a second subset of bytes selected at said receiver from said first subset of bytes, each byte in said second subset having a corresponding address, each byte in said second subset corresponding to a byte in said unique set of bytes and having the same address as the corresponding byte in said unique set of bytes.

44. The structure of claim 43 wherein the means for identifying said second subset of bits at the sender comprises:

means for sending the addresses of said second subset of bytes to the sender to allow the sender to identify the bytes in the second subset of bytes by their addresses in said unique set of bytes.

45. The structure of claim 44 including:

means for obtaining, at both said receiver and said sender, an encryption key from the second subset of bytes.

46. The structure of claim 45 wherein said means for obtaining comprises:

means for converting, at both said receiver and said sender, the second subset of bytes to an encryption key using an irreversible algorithm.

47. The structure of claim 45 including:

means for encrypting said information at said sender using said encryption key; and means for decrypting said encrypted information received at said receiver also using said encryption key.

48. The structure of claim 47 wherein said means for encrypting comprises:

a data register for holding data to be encrypted;

an encryption register for holding the encryption key to-be used to encrypt the data; and a plurality of exclusive OR gates each containing two input leads, the input leads on each exclusive OR gate being connected to receive one bit from the data register and one bit from the encryption register thereby to be capable of producing an output signal reflecting the data in said data register encrypted by the encryption key in the encryption register.

49. The structure of claim 47 wherein said means for decrypting comprises:

an encryption data register for storing encrypted data;

an encryption key register for storing the encryption key; and a plurality of exclusive OR gates each containing two input leads, one input lead being connected to a corresponding bit register in the encrypted data register and the other input lead being connected to a corresponding encryption bit storage cell in said encryption key register, thereby to be capable of producing output signals from said exclusive OR gates the decrypted data.

50. The structure of claim 47 including:

means for encrypting the unique set of bits at said sender with a third set of bits unique and known only to the sender to protect the unique set of bits.

51. Structure for encrypting a message to be transmitted from a sender to a receiver which comprises:

means for generating a master signature associated with the sender, said master signature comprising a plurality of bytes of information, each byte being represented by a unique address;

means for providing at a receiver an access signature, said access signature comprising a first subset of the bytes making up the master signature, said bytes in said first subset of bytes having associated with them their addresses in the master signature;

means for generating at the receiver a session signature, said session signature comprising a second subset of bytes from the access signature, said second subset of bytes having associated therewith their addresses in the master signature;

means for transmitting the addresses of said second subset of bytes to the sender thereby to allow the sender to identify from the master signature said second subset of bytes;

means for using said second subset of bytes to encrypt the message at the sender; and means for using said second subset of bytes at the receiver when the encrypted message is received at the receiver, to decrypt the received message at the receiver.

52. The structure of claim 51, wherein said means for using said second subset of bytes to encrypt the message at the sender and said means for using said second subset of bytes to decrypt the received message at the receiver comprise:

means for deriving an encryption key at said sender from said subset of bytes;

means for deriving the same encryption key at said receiver from said subset of bytes;

means for encrypting at the sender the message to be sent to the receiver using said encryption key;

means for sending said encrypted message to the receiver; and means for decrypting the received message using the encryption key derived at the receiver, whereby the second subset of bytes from which the encryption key is derived is never transmitted between the sender and the receiver.

53. Structure for generating an encryption key for use in encrypting information to be transmitted from a sender to a receiver which comprises:

means for generating a master signature associated with a sender;

means for storing at the sender the master signature associated with the sender, said master signature containing a first plurality of bytes of information, each byte being identified by a unique address;

means for storing at a receiver a first subset of bytes selected from said first plurality of bytes, the bytes in said first subset of bytes being identified by the addresses of said bytes in said master signature and being denoted as an access signature;

means for selecting at the receiver from the first subset of bytes a second subset of bytes, said second subset of bytes being randomly selected and being denoted as a first session signature, each byte in said second subset being identified by the same address as said byte had in the master signature to allow the identification of said byte in the master signature;

means for sending the addresses of said second subset of bytes from the receiver to the sender;

means for identifying at the sender from the master signature stored at the sender the second subset of bytes from the addresses sent from the receiver to the sender; and means for generating at both the sender and the receiver from said second subset of bytes a first encryption key using an irreversible algorithm, said first encryption key to be used in encrypting a message to be transmitted from the sender to the receiver.

54. The structure of claim 53 wherein the receiver is a hub in a computer network.

55. The structure of claim 54 wherein a second receiver is connected to said hub.

56. The structure of claim 55 wherein information is to be transmitted from the sender to the second receiver through said hub, said structure including:

means for generating a second master signature associated with the second receiver;

means for storing at the second receiver the second master signature, said second master signature containing a second plurality of bytes of information, each byte being identified by a unique address;

means for storing at said hub a third subset of bytes selected from said second plurality of bytes, the bytes in said third subset of bytes being identified by the addresses of said bytes in said second master signature and being denoted as a second access signature;

means for selecting at said hub from the third subset of bytes a fourth subset of bytes, said fourth subset of bytes being randomly selected and being denoted as a second session signature, each byte in said fourth subset being identified by the same address as said byte had in the second master signature to allow the identification of said byte in the second master signature;

means for transmitting the addresses of said fourth subset of bytes from the hub to the second receiver;

means for identifying at the second receiver from the second master signature stored at the second receiver the fourth subset of bytes using the addresses transmitted from the hub to the second receiver; and means for generating from said fourth subset of bytes at both the second receiver and the hub a second encryption key, said second encryption key to be used in encrypting a message to be transmitted from the hub to the second receiver.

57. Structure as in claim 56 wherein said means for generating said second encryption key uses an irreversible algorithm.

58. The structure of claim 57 including:

means for encrypting information to be transmitted from the sender to the second receiver using the first encryption key;

means for transmitting the encrypted information from said sender through said hub to said second receiver;

means for encrypting at the hub the first encryption key using the second encryption key; and means for transmitting the encrypted first encryption key from the hub to the second receiver, there to be decrypted and used by the second receiver to decrypt the transmitted encrypted message received at the second receiver from the sender.

59. The structure of claim 58 including:

means for passing said message being sent from said sender to said second receiver through a second hub;

means for encrypting the first encryption key at said first hub using an intermediate encryption key for transmission of information from the first hub to the second hub; and means for decrypting the first encryption key at said second hub and re-encrypting at said second hub the first encryption key with a second encryption key used for transmission of information between the second hub and the second receiver;

whereby the message to be transmitted from said sender to the second receiver is able to pass through said first hub, said second hub and then to the second receiver and there be decrypted using the first encryption key.

60. The structure of claim 53 including:

means for storing the first subset of bytes selected from said first plurality of bytes at both the sender and the receiver;

means for generating a first part of said second subset of bytes at the sender and a second part of said second subset of bytes at the receiver; and means for combining at both the sender and the receiver said first part and said second part to form said second subset of bytes at both the sender and the receiver.

61. Structure for secure transmission of information from a sender to a receiver which comprises:

means for providing at the sender a master signature A comprising a plurality of bytes, each byte in the master signature A being identified by a unique corresponding address;

means for providing at the receiver a master signature B made up of a second plurality of bytes, each byte in said second plurality of bytes being identified by a unique corresponding address;

means for storing at the sender a first subset of bytes selected from the master signature B together with the addresses in the master signature B of the bytes in said first subset of bytes, said first subset of bytes being denoted as access signature B;

means for storing at the receiver a second subset of bytes selected from said master signature A together with the addresses in the master signature A of the bytes in said second subset of bytes, said second subset of bytes being denoted as access signature A;

means for generating at the sender from said first subset of bytes a third subset of bytes, said third subset of bytes being denoted as session signature B;

means for generating at the receiver from said second subset of bytes a fourth subset of bytes, said fourth subset of bytes being denoted as session signature A;

means for transmitting the addresses in the master signature B of the bytes in the third subset of bytes to the receiver;

means for transmitting the addresses in the master signature A of the bytes in the fourth subset of bytes to the sender;

means for using the third subset of bytes to encrypt a message to be transmitted from the sender to the receiver; and means for using the fourth subset of bytes to encrypt a message to be transmitted from the receiver to the sender.

62. The structure of claim 61 including:

means for combining said third subset of bytes and said fourth subset of bytes to form a combined session signature; and means for using said combined session signature to generate an encryption key for use in transmitting information from the sender to the receiver or vice versa.

63. The structure of claim 62 including:

means for generating an encryption key using an irreversible algorithm on said combined session signature.

64. Structure for generating an encryption key for use in securing transmission of information from a first station to a second station which comprises:

means for selecting a subset of bits at the second station from a set of bits located at both the second station and the first station, selected groupings of bits in said subset having unique addresses; and means for identifying the same subset of bits at the first station by transmitting the addresses of said selected groupings of bits from the second station to the first station;

whereby the encryption key is related to said subset of bits.

65. The structure of claim 64 wherein said first station is a first hub and said second station is a second hub.

66. Structure for securing the transmission of information from a sender to a receiver which comprises:

means for selecting, at the receiver, from a first set of bits located at both the receiver and the sender, a first subset of bits;

means for selecting, at the receiver, from said first set of bits located at both the receiver and the sender a second subset of bits, whereby the first subset of bits and the second subset of bits are identified by a first set of addresses and a second set of addresses, respectively;

means for encrypting, at the receiver, the addresses of the second subset of bits with the bits in the first subset of bits; and means for transmitting to the sender the addresses of the first subset of bits and the encrypted addresses of the second subset of bits;

thereby to allow the sender to encrypt the information to be transmitted from the sender to the receiver using the bits in the second subset of bits as determined by the sender from the addresses of the first subset of bits and the encrypted addresses of the second subset of bits transmitted from the receiver to the sender, the encrypted addresses of the second subset of bits being decrypted using the first subset of bits identified at the sender by their addresses.

67. The structure of claim 66 including:

means for using, at the sender, the addresses of the first subset of bits to identify the bits in said first subset and then using the bits in said first subset to decrypt the addresses of the second subset of bits thereby to identify the second subset of bits.

68. The structure of claim 67 including:

means for using, at the sender, the second subset of bits to encrypt the information to be transmitted to the receiver.

69. The structure of claim 67 including:

means for using, at the sender, the second subset of bits to derive an encryption key using an irreversible algorithm; and means for using said encryption key to encrypt the information to be transmitted from the sender to the receiver.

70. The method of providing an encryption key for securing transmission of information from a sender to a receiver which comprises:

a. selecting a subset of bits at a receiver from a set of bits located at both the receiver and the sender, selected groupings of bits in said set of bits having unique addresses said bits in said subset of bits being uniquely identified by a unique subset of addresses;

b. identifying the same subset of bits at the sender by transmitting the unique subset of addresses from the receiver to the sender;

c. deriving at both the sender and the receiver an encryption key from said subset of bits;

d. using said encryption key to encrypt at the sender information to be transmitted from the sender to the receiver;

e. using at the receiver the same encryption key to decrypt the information transmitted from the sender to the receiver;

f. discarding the encryption key upon completion of the transmission of information; and g. generating a new encryption key by repeating steps a through f for a subsequent transmission of information from the sender to the receiver.

* * * * *